United States Patent [19]

Cresens

[11] Patent Number: 5,659,234
[45] Date of Patent: Aug. 19, 1997

[54] VIBRATION REDUCTION FOR STEPPING MOTOR BY VECTOR ANGLE AND VECTOR LENGTH MODULATION

[75] Inventor: Marc Cresens, Bedford, Mass.

[73] Assignee: AGFA Gevaert, N.V., Belgium

[21] Appl. No.: 375,745

[22] Filed: Jan. 20, 1995

[30] Foreign Application Priority Data

Feb. 4, 1994 [EP] European Pat. Off. ............. 94200309

[51] Int. Cl.⁶ ........................................................ H02P 8/00
[52] U.S. Cl. .......................... 318/696; 318/685; 318/569; 318/600
[58] Field of Search ........................ 318/696, 685, 318/798–815, 254, 138, 439, 460, 432, 629, 610, 611, 569, 600; 388/928.1, 806, 823, 833; 364/221

[56] References Cited

U.S. PATENT DOCUMENTS

| | | | |
|---|---|---|---|
| 3,621,351 | 11/1971 | Goto | 318/254 X |
| 4,255,696 | 3/1981 | Field, II | 318/696 |
| 4,743,822 | 5/1988 | Futami et al. | 318/610 X |
| 4,843,294 | 6/1989 | Bhat et al. | 318/696 |
| 4,980,617 | 12/1990 | Tajima et al. | 318/254 |
| 5,218,283 | 6/1993 | Wills et al. | 318/800 X |

*Primary Examiner*—Karen Masih
*Attorney, Agent, or Firm*—John A. Merecki

[57] ABSTRACT

A method is disclosed for the reduction of vibrations in a system using a stepping motor, driving parts at a constant velocity. On a test rig, the dynamic behaviour of the stepping motor in micro stepping mode is measured by a system comprising a rotation encoder. The measured data are filtered and used to compensate the unwanted speed fluctuations. In a first method, compensation is done by modification of the theoretical current-vector angles of basic micro stepping, while keeping the current-vector length constant. In a second method, first the current-vector angles are optimized, where after the current-vector lengths are optimized to correct the stepping motor for a wide range of speeds and load torques. In both methods, the stepping frequency is constant over all steps and determined by the desired angular speed of the stepping motor.

16 Claims, 9 Drawing Sheets

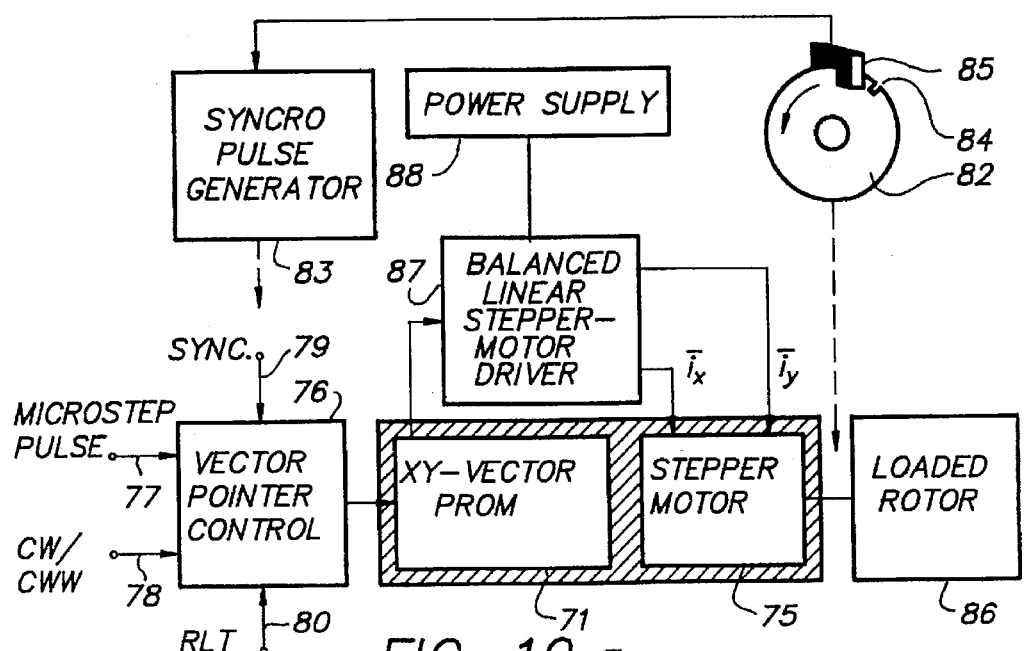
FIG. 10.a
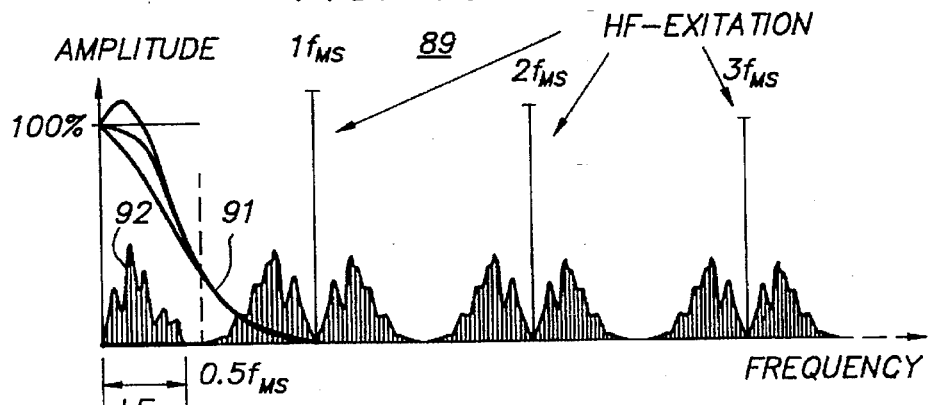
FIG. 10.b
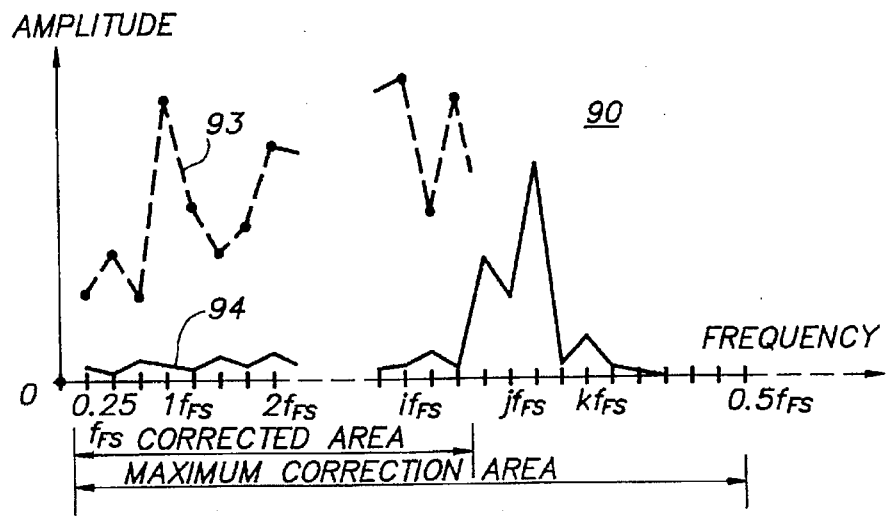
FIG. 10.c

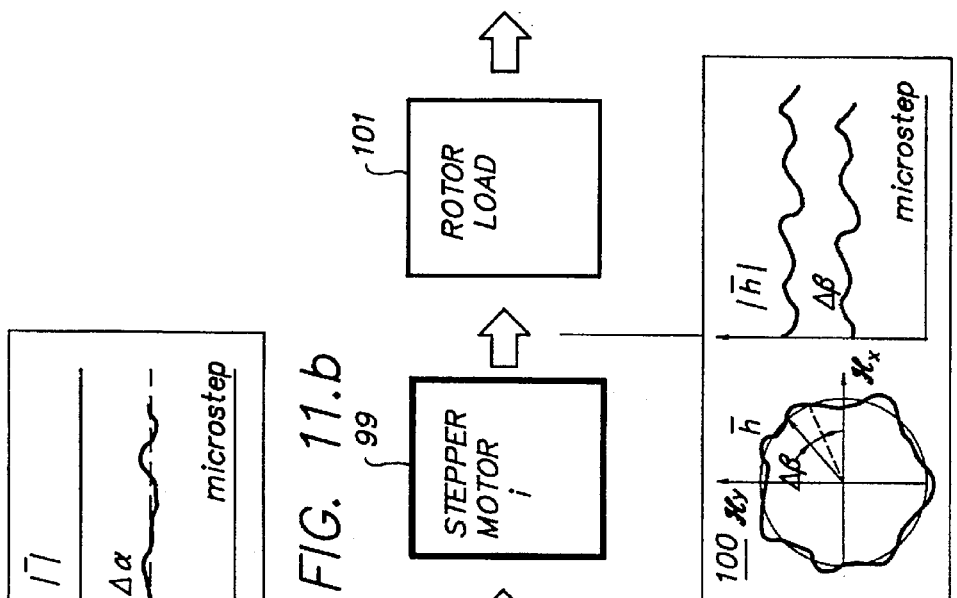
FIG. 11.a FIG. 11.b FIG. 11.c FIG. 11.d FIG. 11.e

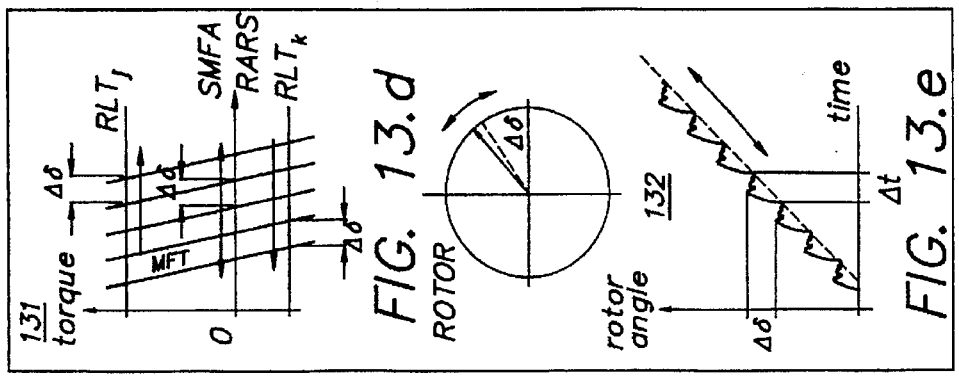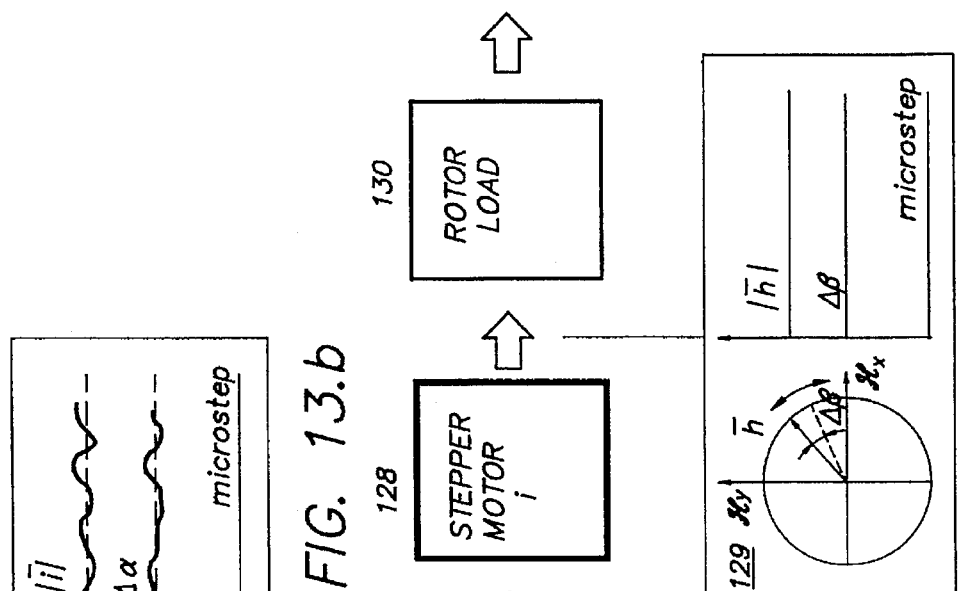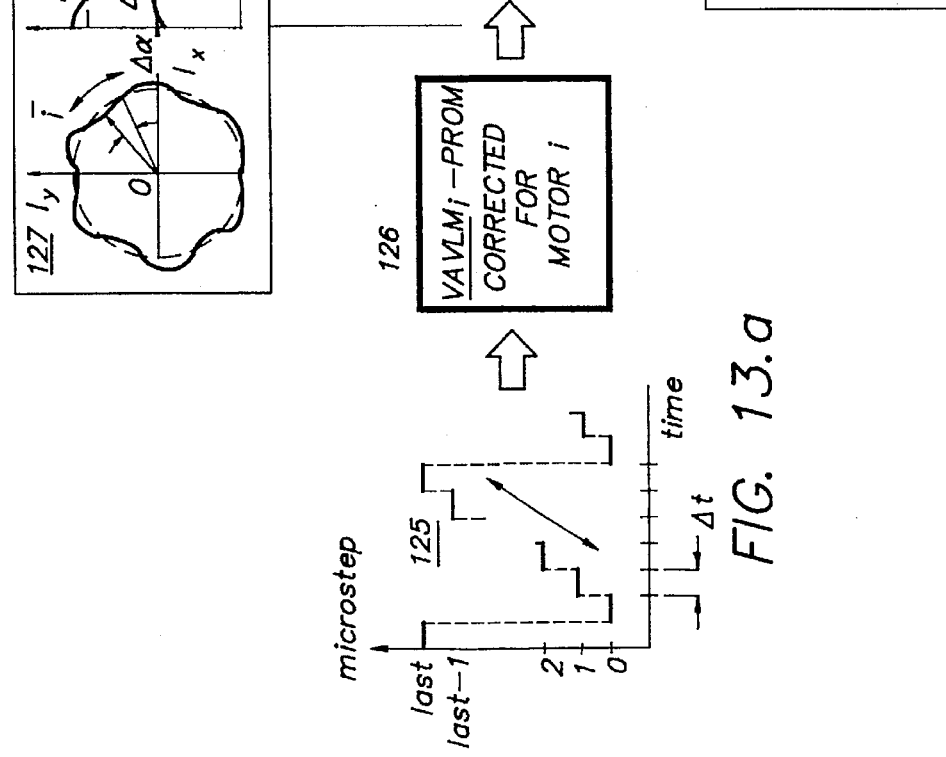

VIBRATION REDUCTION FOR STEPPING MOTOR BY VECTOR ANGLE AND VECTOR LENGTH MODULATION

DESCRIPTION

1. Field of the Invention

The present invention relates to a method for improving the angular speed stability of a micro stepping motor by micro stepping control and an apparatus for doing the same. The method can be used in electronic image scanners for office and prepress systems.

2. Background of the Invention

Stepping motors are widely used for digitally controlled accurate positioning systems, without a need for feedback. Such a motor can be used in start/stop mode for positioning a movable element of a device at a fixed location. The motor therefore accelerates, goes to the new position and stops. After the motor has come to a standstill, the position is very accurately established. Another operation mode for a stepping motor is a continuous motion at a predetermined speed. The speed is not constant, mainly due to construction tolerances of the stepping motor. In a two phase stepping motor, the two sets of winding coils—designated X and Y—are not precisely placed with respect to each other in order to achieve the theoretically correct orientation of the magnetic fields. The amount of windings can be different for different coils, the angular distance between teeth on rotor and stator can vary within certain tolerances, the air gap between rotor and stator teeth is not precisely constant, etc. If a constant speed can be achieved by the motion of the motor, this results in two advantages.

First of all, one can be sure that at constant time intervals, the motor has moved over the same distance. For example by sampling at a constant rate an image displaced by a stepping motor, the location of the samples is equally spaced over the image. In the case of colour work, a colour original is scanned three times in succession in order to produce a red, green and blue image component by appropriate colour filtering. The image signals of these three image components should coincide with each other in time within close limits, since an occasional misalignment in the final print is easily noticeable with naked eye. A very good image registering is particularly required in the production of prints or printing plates in the graphic industry where deviations in the relative positions of the separation images should be smaller than approximately ten micrometers. Any variation in the angular displacement of the motor in each step is translated into a variation in the lateral movement of the scanning unit and therefore affects the precision of its movement over the document. While scanning motors are manufactured to narrow tolerances which are acceptable for many applications, we have found that even minor variations in the size of components and their alignment can lead to variations in angular displacement sufficient to affect the fidelity of reproduction.

Another advantage of constant speed is that no accelerations are introduced in the mechanical moving parts. A variation in speed introduces in fact positive and negative accelerations and accelerations are linked with forces which introduce vibrations of the whole mechanical system. These vibrations are superimposed on the linear motion.

Such vibrations can be attenuated passively or choked down by external friction. However, mechanical dampers such as friction discs or fluid flywheels add to system cost and complexity. By building in too much friction into the system to arrive to an over-critical damped oscillating system, it is possible that the motor skips teeth because the load torque on the motor axis becomes higher than allowed by the specifications. It is also possible that the friction wears out and decreases after long operation. Such vibrations can be attenuated also by mechanical low pass filtering, practically realised by increasing the inertia of the moving parts, e.g. by adding inertia wheels or increase the mass of the spindle, which can be a costly operation. Moreover, this makes the system slow to react to wanted variations. The frequency of the disturbing vibrations can also be shifted—to escape from the bothering effects—by selection of the transmission ratio using gear-wheels. This reduces the design freedom, makes the mechanical system heavier and more expensive. The stepping motor must then rotate faster and could probably introduce other disturbing vibrations, e.g. due to the gear-box. Maybe a faster and thus more expensive stepping motor must be selected, the price of which is almost a linear function of the speed.

During assembly of high quality scanners, stepping motors of high quality must be selected. A specific selection based on vibration criteria gives a loss of 30% of stepping motors, which cause vibrations beyond the acceptable tolerances.

Therefore it's better to prevent the source of vibrating, namely to eliminate the accelerations, in other words to decrease the speed variations. This can be achieved by active electronic correction. The published European application 0 462 335 A1 of the Toshiba company gives devices wherein the stepping motor can be used, also appropriate for our current invention, and describes the problem in detail for an open ended stepping motor system with five phases and operated in full step mode. In that application the same problem is described for a two phase stepping motor driven in micro stepping mode and a five phase stepping motor driven in the same mode. The method in this application is based on pulse width modulation. To achieve a more stable angular speed, each micro step the current intensity vectors are activated for a different duration of time. The signals are stored in volatile memory means for different angular speeds of the stepping motor. This speed is transformed by the stored signals giving the amplitude and phase for a correction signal changing the pulse width. From the description can be understood that only one frequency for pulse width modulation is determined. This is a severe restriction that only permits to correct the vibrations to a certain amount.

In Control Engineering, Vol. 32, no. 1, January 1985, on pages 111–113 Frank Arnold Jr. gives a method used to improve the positional resolution of a step motor without feedback and closed servo loops, by microstepping and reviews compensation methods. Also there the problem is mentioned that current level increments based on equal-angle increments of a sine wave will not produce equal-angle movements of the motor shaft. He describes a method used to measure how much each step motor deviates from the ideal and then to store step-by-step correction values into computer memory. The conclusion is that compensation has actually made matters worse, and this method is abandoned without further specification. The author rather proposes a solution to utilize a step motor that is virtually free of harmonic distortion. From the diagrams can be learned that the improvement in positional accuracy is about 3 to 4. Apart from this reduced improvement, the proposed methods cure the situation only for a static behaviour, start-stop positioning of the stepper motor, whereas (dynamic) system vibrations are the main problem in scanner systems. The harmonics of such vibrations are a linear function of the angular velocity of the stepper motor.

According to DE-A-28 50 539 the static position is improved by modification of the drive signals. But this document does not address the dynamic correction of the stepper motor. It has been well established that the static and dynamic behaviour of the stepper motors is very different.

OJECTS OF THE INVENTION

It is an object of the invention to substantially improve the dynamic behaviour of a stepping motor operated at a specific angular speed.

It is another object of the invention to provide a generally applicable method to measure the specific vibrations of each individual stepping motor controlled by micro stepping.

Yet another object of the present invention is to provide a method to improve the dynamic behaviour of a stepping motor at various ranges of angular velocity.

Another object of the present invention is to reduce angular speed variations of a stepping motor and make the displacements spatially predictable and correct.

Another object of the invention is to achieve an optimal vibration correction with a wide frequency spectrum, independent from rotation direction, motor torque and rotor load.

SUMMARY OF THE INVENTION

In accordance with the present invention, a method is disclosed for driving a two phase stepping motor at a desired constant angular speed in micro stepping mode consisting of the following steps:

- choosing a maximum constant current-value $I_O$, based upon the characteristics of said stepping motor;
- establishing a sequence of M current-value pairs $(I_{xi}, I_{yi})$, current-value $I_{xi}$ corresponding to the intensity of the current $I_x$ to be applied to a coil X of said stepping motor and current-value $I_{yi}$ corresponding to the intensity of the current $I_y$ to be applied to a coil Y of said stepping motor;
- establishing the duration T of a micro step based upon said desired angular speed;
- applying repeatedly said sequence wherein each of said current-value pairs $(I_{xi}, I_{yi})$ is applied sequentially and wherein $I_x$ and $I_y$ corresponding to said current-value pair $(I_{xi}, I_{yi})$ are applied simultaneously to said coil X and Y for said duration T of a micro step;

wherein said current-value pairs $(I_{xi}, I_{yi})$ have following properties:

the square root I of the quadratic sum $I^2=I^2_{xi}+I^2_{yi}$ of the current-values $I_{xi}$ and $I_{yi}$ of each individual current-value pair has a value substantially equal to said maximum constant current-value $I_0$;

a plurality of current-values $I_{xi}$ have a value substantially equal to $I*\cos(360°*i/N+\alpha)$, wherein:

I is said square root of said quadratic sum $I^2$;

i is an integer index in the sequence $(I_{xi}, I_{yi})$, ranging from 1 to M;

N is an integer divider of M; and $\alpha$ is an arbitrary constant;

and characterised therein that:

at least one current-value $I_{xi}$ has a value substantially different from $I*\cos(360°*i/N+\alpha)$.

For a 400 steps stepping motor with sixteen micro steps per full step FS, N equals to 64. M can be chosen to be 64 for a 4*FS correction and 6400 for a full rotor turn correction. M can even be any integer multiple of N=64, e.g. 128, 256 etc.

The requirement that I is substantially equal to $I_0$ results in a set of current-vectors $(I_x, I_y)$, the endpoints of whom are situated on a circle with radius $I_0$. The term "substantially" must be understood from the discretisation standpoint. As will be described below, the current-values $I_{xi}$ and $I_{yi}$ can take a reduced number of discrete values. It is thus impossible to find always two current-values such that the equation $I=I_0$ is fulfilled. Therefore a small deviation from $I_0$ is allowed. If the current-values can take integer values only, then this deviation is ±1. All values that fall outside the range of $[I_0-1, I_0+1]$ are substantially different from $I_0$. The same applies with respect to the current-values $I_{xi}$.

DETAILED DESCRIPTION OF THE INVENTION

The invention is described hereinafter by way of example with reference to the accompanying figures wherein:

FIG. 10a is a schematic view of the stepping motor together with the specific PROM mounted in the final system, FIG. 10b shows a frequency analysis of the system.

FIG. 10c shows the low frequency part of the rotor excitation spectrum of FIG. 10b.

FIG. 11a is a schematic view of the driving signals for a vector angle modulated (VAM) system.

FIG. 11b shows a VAM-moderated current vector, FIG. 11c shows a distorted magnetic field vector. FIG. 11d shows a (RARS, torque) digram, FIG. 11e shows a (time, rotor angle) diagram.

FIG. 13a is a schematic view of the driving signals for a vector angle and vector length modulated (VAVLM) system.

FIG. 13b shows a VAVLM-modulated current vector; FIG. 13c shows a corrected magnetic filed vector; FIG. 13d shows a (RARS, torque) diagram; FIG. 13e shows a (time, rotor angle) diagram.

Figure 14:
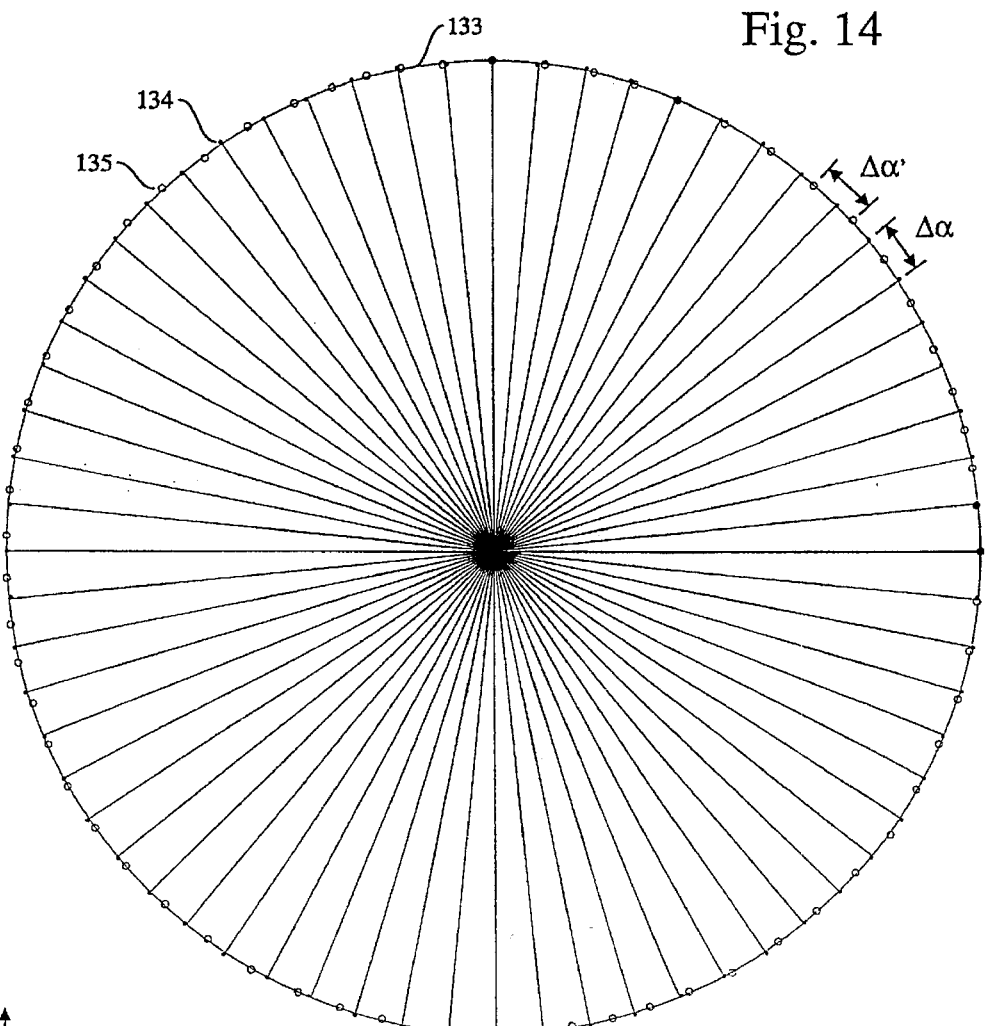

FIG. 14 is a vector diagram showing the theoretical current-vector angles and the modulated current-vector angles for a specific VAM-corrected stepping motor.

Figure 15:
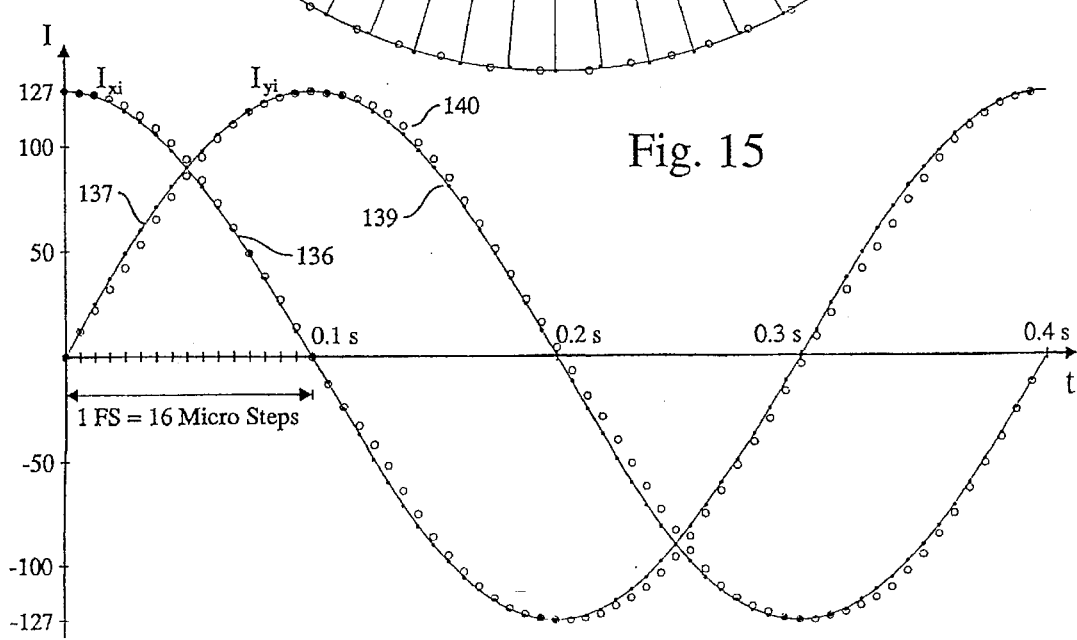

FIG. 15 is a graph of the current-values $I_{xi}$ and $I_{yi}$ as a function of the time for both the theoretical and modulated current-values for the same stepping motor as in FIG. 14.

Figure 7:
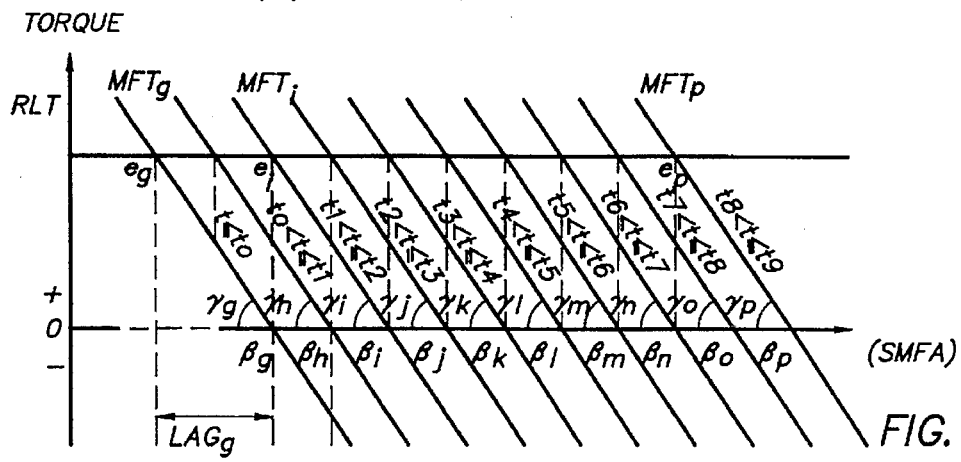
FIG. 7 is a graph showing the various points of equilibrium at consecutive micro steps, for a range of rotor load torque values.
Figure 8:
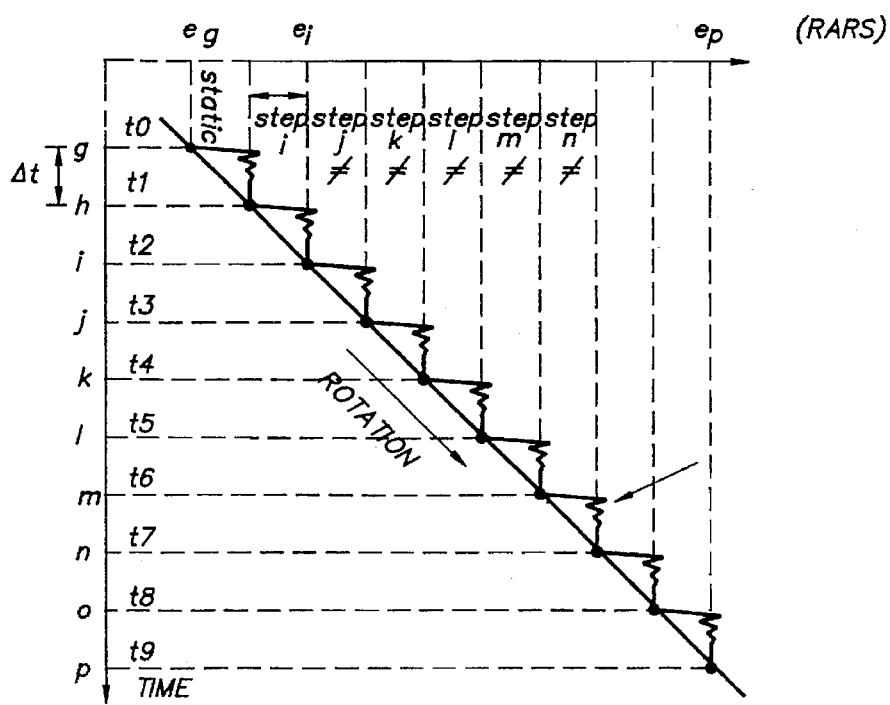
FIG. 8 is a graph showing the dynamic behaviour—i.e. the angular position of a rotating rotor as a function of the time—of a typical stepping motor operated with a specific external rotor load torque.

First we will set up an analysis for the origin of the vibrations. The error model of our analysis shown in FIG. 7 and 8 gives then an indication on how the problems can be solved by the method of the current invention.

Figure 1:
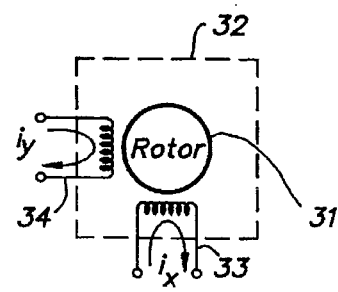
FIG. 1 is a schematic view of a two phase stepping motor, the motion of which is improved by the method of the present invention.

Referring to FIG. 1, a two phase hybrid stepping motor is schematically shown. The stepping motor consists of a circular rotor 31, enclosed in a stator 32. The stator of a two phase stepping motor is provided with two sets of winding coils, designated respectively coil X 33 and coil Y 34. On FIG. 1 only the bottom part of coil X 33 is shown. The top part of coil X 33 is symmetrically positioned with respect to the centre of the rotor. The bottom and top part are conductively connected to each other such that a current $I_x$ through the bottom coil X 33 induces a magnetic field parallel to and in the same sense as the magnetic field induced in the top part of coil X by the same current $I_x$. The same applies for the current $I_y$ in coil Y 34 for which its symmetrical right part is not shown on FIG. 1. The motor is activated by feeding current to the X and Y coils in a predetermined sequence. The coils X and Y are arranged such that by applying a current $I_x$ and no current $I_y$ gives a magnetic field $H_x$ (directed from top to bottom or vice versa, dependent on the sense of $I_x$) that is basically perpendicular to the magnetic field $H_y$ (directed from left to right or vice versa, dependent on the sense of $I_y$) obtained by applying a current $I_y$ and no current $I_x$. Suitable stepping motors include the VEXTA (Trade Mark) range of motors, In particular the VEXTA model C4563-9212. This is a 400 step stepping motor. As will be discussed below, this means that each time the current-vector formed by ($I_x$, $I_y$) describes a full turn of 4 steps or 360°, the rotor of the micro stepping motor rotates over 360°/100=3.6°.

Figure 2:
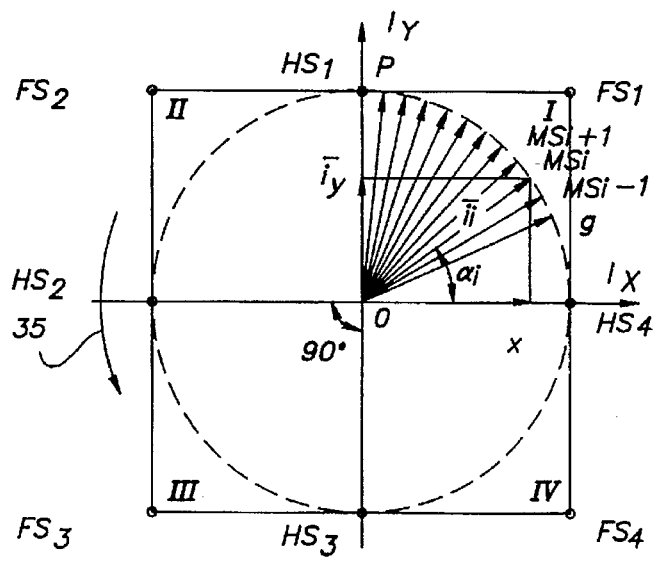
FIG. 2 is a theoretically ideal current-vector diagram for full step, half step and micro step driving current-signals.

FIG. 2 shows the current-vector diagram for driving the stepping motor by full steps (FS), half steps (HS) and basic micro stepping (MS). In abscissa, ($I_x$-axis) one can read the intensity $I_x$ of the current in coil X. In ordinate, ($I_y$-axis) one can read the intensity $I_y$ of the current in coil Y. The $I_y$-axis forms an angle of 90° with the $I_x$-axis.

The theoretically ideal continuous driving conditions for the currents $I_x$ and $I_y$ are given by the equations:

$$I_x = I_0 * \cos(\omega * t) \quad \text{(I.a)}$$

$$I_y = I_0 * \sin(\omega * t) \quad \text{(I.b)}$$

$I_0$ is the maximum current in coil X or coil Y, designated for the operation of the stepping motor. ω is the circular frequency of the current-vector and t is the time. These equations indicate that the endpoint of the current-vector follows the dashed circle. By varying $I_x$ and $I_y$ continuously as a function of the time, a continuously varying magnetic field vector will be generated and a smooth continuous motion would theoretically result.

In practise however, the stepping motor can be driven by a simple stepping motor driver, resulting in full steps (FS), as shown in FIG. 2. A stepping motor driver converts a digital input signal or code to an analog output current that can take a reduced set of quantized levels. A simple form of such a driver can generate a fixed current $I_0$ and change its polarity, resulting in a positive +$I_0$ or negative -$I_0$ current at full rate $I_0$, both for $I_x$ and $I_y$. As shown in table I, there are four possible combinations. These are called the four Full Steps FS, and are numbered $FS_1$, $FS_2$, $FS_3$, $FS_4$ according to their place in the diagram of FIG. 2. Some spaces in table I are left empty to enable comparison with table II showing Half Steps.

TABLE I

Currents in coil X and Y according to full steps

| Step | $FS_1$ | $FS_2$ | $FS_3$ | $FS_4$ |
|---|---|---|---|---|
| $I_x$ | +$I_0$ | -$I_0$ | -$I_0$ | +$I_0$ |
| $I_y$ | +$I_0$ | +$I_0$ | -$I_0$ | -$I_0$ |

Applying the four full steps $FS_1$ to $FS_4$ and back to $FS_1$ in this order, causes the current-vector to rotate over 360° in the direction as indicated by the rotation arrow 35. The rotor of a 400 steps stepping motor rotates over 3.6° accordingly. Apart from mechanical imperfections resulting in motor specific vibrations, the harsh discrete stepping of the current-vector introduces extra vibrations. The base component of the vibrations introduced by Full Stepping has a frequency equal to the frequency at which a full step occurs. This frequency is often used as a reference, and indicated by FS-frequency or just FS. By increasing the angular speed of the stepping motor, the base frequency of the vibrations will increase with the same factor and FS too. This mode of operation introduces large variations in torque every time a new full step is applied, each time when the current-vector is rotated over 90°. This happens not as frequently as for a stepping motor driven in half step operation or in micro stepping, but the torque variations are considerably higher. That means that the base frequency for vibrations is lower, but the amplitude of the vibrations is higher than for the methods described below.

The stepping motor can also be driven by an improved stepping motor driver, where $I_x$ and $I_y$ not only can take the values +$I_0$ and -$I_0$, but also the value zero, resulting in full steps (FS) and half steps (HS), as shown in table II. The FS points are the same as for the full step stepping motor driver. The HS points are added in between the FS points, as is also shown in the diagram of FIG. 2.

TABLE II

Currents in coil X and Y according to full (FS) ad half (HS) steps

| Step | $FS_1$ | $HS_1$ | $FS_2$ | $HS_2$ | $FS_3$ | $HS_3$ | $FS_4$ | $HS_4$ |
|---|---|---|---|---|---|---|---|---|
| $I_x$ | +$I_0$ | 0 | -$I_0$ | -$I_0$ | -$I_0$ | 0 | +$I_0$ | +$I_0$ |
| $I_y$ | +$I_0$ | +$I_0$ | +$I_0$ | 0 | -$I_0$ | -$I_0$ | -$I_0$ | 0 |

As can be seen in FIG. 2, the vector length of the current-vector is different, causing a different magnetic spring stiffness—as will be discussed later on—and also the angular change of the current-vector I is still considerable.

To avoid the mechanical stepping and thus improve the smooth operation of the stepping motor, micro stepping has been introduced. The purpose is to generate an almost continuously varying current in the coils X and Y. This will give smaller torque variations and thus less vibrations due to the driving mechanism. The frequency of the torque variations will however be considerably higher. One full step FS e.g. in quadrant I of FIG. 2 is typically equally divided in sixteen micro steps $MS_1$, $MS_2$, . . . $MS_{16}$. Thus, the four quadrants I, II, III and IV or the whole circle is divided in 64 micro steps, or sixteen micro steps per FS. For the preferred motor for our invention, the 400 steps stepping motor, there are 6400 micro steps per full turn of the rotor.

Moreover, for basic micro stepping the currents $I_x$ and $I_y$ get such values assigned that the endpoint of the resulting current-vector $I_i$ is always on a circle with radius $I_0$, i.e. the vector length $|I_i|$ of every current-vector $I_i$ according to step i is constant: $|I_i|=I_0$. The angular difference $\Delta\alpha=\alpha_{i+1}-\alpha_i$ between two consecutive current-vectors $I_{i+1}$ with vector angle $\alpha_{i+1}$ and $I_i$ with vector angle $\alpha_i$ corresponding with two micro steps numbered i and i+1 is constant for basic micro stepping and is equal to 360°/64=5.625° or 5°37'30". That means that the currents $I_x$ and $I_y$ vary according to a quantised cosine- respectively sine-function of the time. This gives the points $MS_{i-1}$, $MS_i$, $MS_{i+1}$ etc. on the dashed circle in FIG. 2. The coordinates of these points fulfil the equations:

$$I_{xi}=I_0 * \cos(\omega * t_i)=I_0 * \cos(\alpha_i) \qquad \text{(II.a)}$$

$$I_{yi}=I_0 * \sin(\omega * t_i)=I_0 * \sin(\alpha_i) \qquad \text{(II.b)}$$

In these equations, $\alpha_i=360°*i/N+\psi$. N is 64 for a system having 64 micro steps per full turn of the current-vector, i ranges from 0 to 63 or—what is equivalent except for a certain phase shift—1 to 64 and $\psi$ is an arbitrary phase shift that can be applied to the sequence $\alpha_i$.

For the method of this invention, the time difference $t_{i+1}-t_i$ is kept constant. This approach is different from the teaching in the above mentioned prior art document EP 0 462 335 A1. By decreasing the time difference between two consecutive steps, the angular velocity of the stepping motor is increased. The indication of micro step numbers g and p corresponds with the same indices used in FIGS. 3, 6, 7 and 8.

Figure 3:
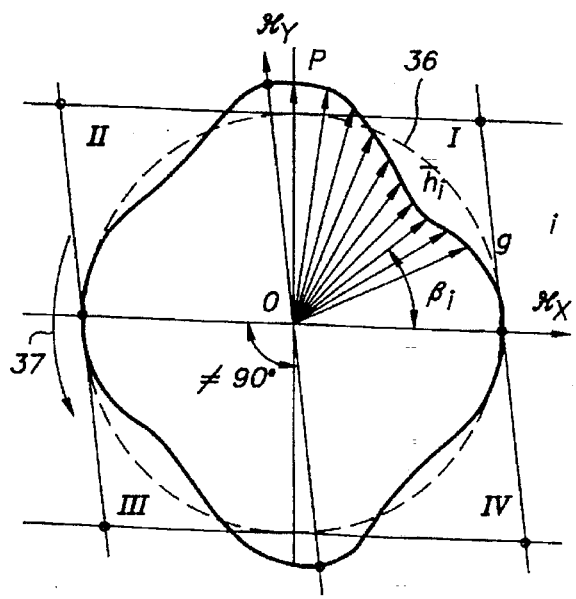
FIG. 3 is a realistic magnetic field vector diagram obtained by driving a real stepping motor with current-vectors shown in FIG. 2.

FIG. 3 shows the magnetic field vector diagram, obtained by basic micro stepping as described in FIG. 2. The current $I_x$ gives a magnetic vector $H_x$, vertical in FIG. 1 and shown on the horizontal axis in FIG. 3. The current $I_y$ gives a magnetic vector $H_y$, horizontal in FIG. 1 and shown on the slanted vertical axis in FIG. 3. If both $I_x$ and $I_y$ are applied, the two magnetic vectors $H_x$ and $H_y$ add up and give the vector $H_i$ as shown in FIG. 3. The length and the direction of $H_i$ is determined by the sum of the vectors $H_x$ and $H_y$. This vector $H_i$ is the stator magnetic field vector, as a result of the current-vector $I_i$. It is due to construction imperfections well possible that the vectors $H_x$ and $H_y$ are not orthogonal with respect to each other. Hence the non-orthogonal axes (16 90°) in this figure. The dashed line gives the desired or theoretical envelope of the endpoints of the magnetic field vectors, obtained by a hypothetical ideal stepping motor, controlled by current-vectors as in FIG. 2. The stepping motor is operated in the range where the magnetic field is a linear function of the applied current through the coil. As such we suppose that the soft iron core of the stator doesn't get saturated, by application of a current well below the specifications. Even then, the magnetic vector H will have its endpoints on an elliptical or even more complex shaped line as shown in FIG. 3, i.e. the length $|H_i|$ of the magnetic field vector fluctuates. The elliptical form stems from the fact that the number of windings in the X-coils can be different from the number of windings in the Y-coils. An elliptical magnetic vector diagram indicates that the stepping motor will accelerate twice per full turn of the current-vector and slow down twice per full turn. This behaviour would result in vibrations with a basic frequency of FS/2. The angle $\beta_i$ that is formed between the positive $H_x$ axis and the magnetic field vector $H_i$ is theoretically equal to $\alpha_i$. However, due to the stepping motor imperfections, $\beta_i$ is different from $\alpha_i$ and $\Delta\beta_i=\beta_{i+1}-\beta_i$ fluctuates unlike $\Delta\alpha$ in FIG. 2.

FIG. 3 represents thus a "real world" conversion between ideal driving currents (FIG. 2) and the resulting magnetic field vector in a practical stepping motor. The sense of rotation 37 of the magnetic field vector is the same as for the current-vector 35 in FIG. 2.

Figure 4:
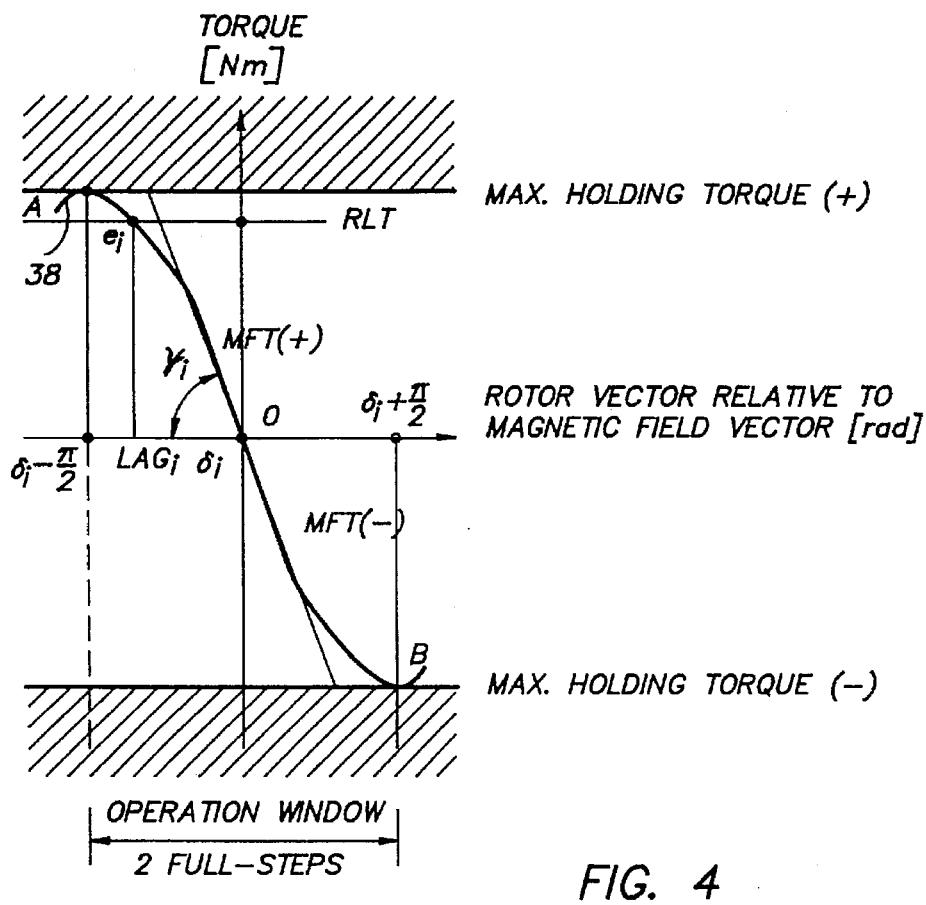
FIG. 4 is a graph of the magnetic field torque (MFT) as a function of the angular difference in orientation between the rotor vector and the magnetic field vector, showing the magnetic spring stiffness.

In FIG. 4, we show how the torque, or more correctly the Magnetic Field Torque (MFT), expressed in Newton-meter [Nm], is related to the lag, expressed in [rad]. The lag is the angular difference between the magnetic field vector $H_i$ and the rotor vector B. The difference is responsible for the magnetic field torque MFT. If $H_i$ and B coincide as in point $\delta_i$, the lag is zero and the magnetic field torque (MFT) vanishes. If there is a difference $LAG_i$, then the magnetic field torque (MFT) will have the value $e_i$, as indicated on FIG. 4. The torque caused by the rotor is always in that direction as to cause $H_i$ and B to coincide. If the lag increases over $-\pi/2$ or $+\pi/2$, the torque decreases and further on changes sign, to align another teeth pair. The external rotor load torque RLT in point A at $\delta_i-\pi/2$ and in point B at $\delta_i+\pi/2$ is the maximum allowed holding torque externally applied to the rotor axis. The RLT must stay between these two extremes at A and B, otherwise the stepping motor could skip teeth. Therefore, the operation window is within [$\delta_i-\pi/2, \delta_i+\pi/2$], which corresponds with 180° or two full steps. The graph in this figure can be repeated indefinitely for integer values j: $-\infty<j<+\infty$, such that $\delta_j=j*2\pi$.

Around the origin, the curve is nearly linear and the inclination $\gamma_i$ corresponds with the linear magnetic spring stiffness $k=tg\gamma_i$. The system can now be theoretically described as an analogy to a damped mass-spring second order system. The mass in the system is formed by the rotor and all the movable parts put in motion by the rotor shaft. The spring corresponds to the magnetic interaction between rotor and stator, characterised by the magnetic spring stiffness k. The friction of all moving parts is analogous to the viscosity of the mechanical damper. This analogy will be further worked out in conjunction with FIG. 8.

Because the MFT curve 38 in FIG. 4 is a sine function, the amplitude of which being a linear function of the length $|H_i|$ of the magnetic vector $H_i$, and because the first derivative dTorque/dLag of that sine function in the origin is a linear function of the amplitude, the magnetic spring stiffness k is a linear function of the length $|H_i|$ of the magnetic vector $H_i$. Theoretically $H_i$ is also a linear function of $I_i$. As such k is a linear function of $I_i$. Practically, as is shown in FIG. 3 in conjunction with FIG. 2, the length of $H_i$ depends on the step i, even if the length of the current-vector $I_i$ remains the same for all steps. This implies that the magnetic spring stiffness k is not exactly the same almost linear function of $I_i$ for different steps or orientations of the current-vector and thus not constant even if $|H_i|$ is kept constant. Later we will describe the importance to keep the magnetic spring stiffness constant for all angles and discuss a method to achieve this, by construction of a magnetic field vector with constant length.

Figure 5:
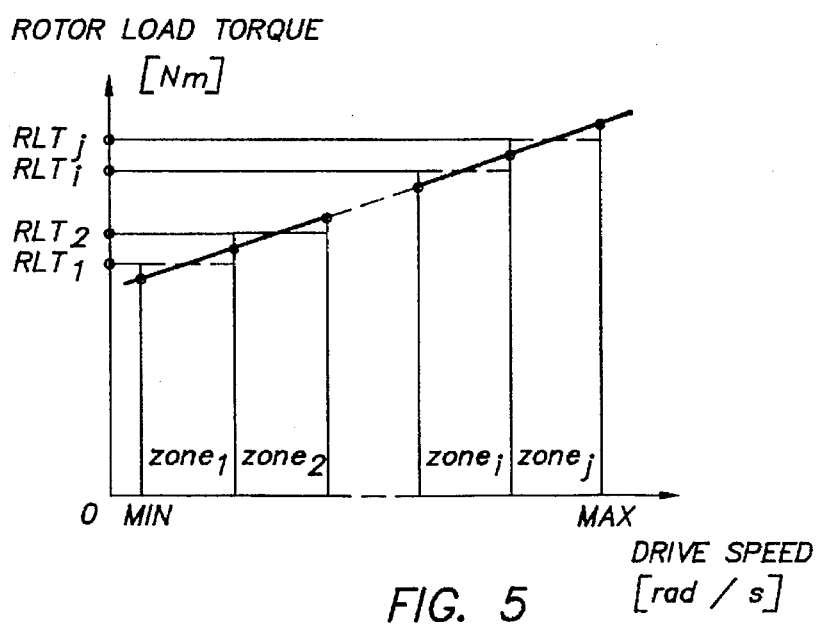
FIG. 5 is a graph of the external rotor load torque as a function of the rotor angular speed of the stepping motor.

FIG. 5 shows that the external rotor load torque (RLT)—expressed in Newton-meter [Nm]—strongly depends on the angular drive speed—expressed in [rad/s]—of the stepping motor. This is mainly due to the fact that the dynamic friction $W_d$ is almost a linear function of the speed. For a minimal motor speed MIN, the rotor load torque RLT during operation will be approximately $RLT_1$. Increasing the speed to MAX, will increase the rotor load torque to $RLT_j$. Every zone$_i$ can be simulated by applying a fixed mean rotor load torque $RLT_j$.

Figure 6:
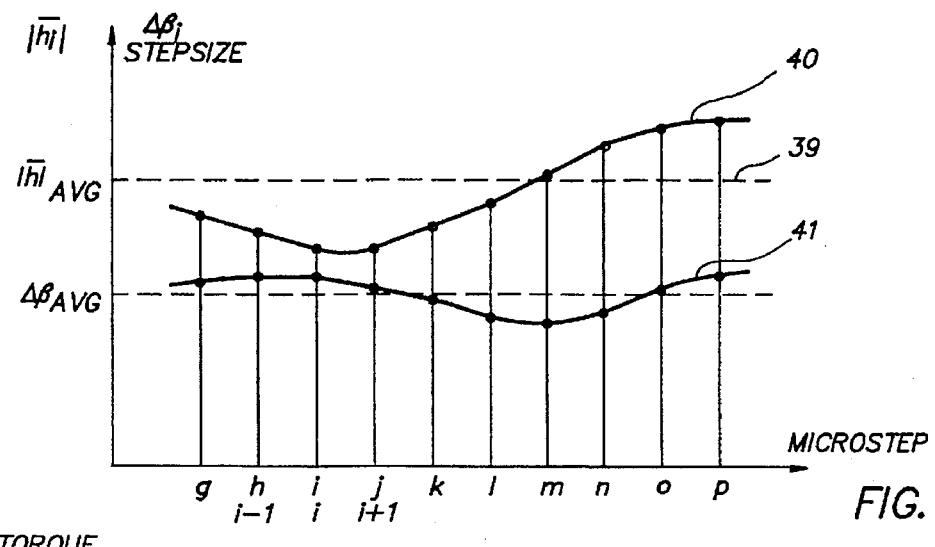
FIG. 6 is a graph showing the magnetic spring stiffness variation over consecutive micro steps and angular step between the magnetic field vectors of consecutive micro steps.

FIG. 6 shows two diagrams. The topmost diagram 40 gives the magnetic spring stiffness k or the magnetic field vector length $|H_i|$ as a function of the consecutive micro step numbers g..p used in FIGS. 2 and 3, for a stepping motor driven by a current-vector $I_i$ with constant length and constant angle increments as shown in FIG. 2. For a hypothetical stepping motor, where $[H_i]$ would be fixed to a constant average length $|H|_{AVG}$, the magnetic spring stiffness would be equal to the target stiffness $tg(\gamma_{AVG})$ for all micro steps, and thus coincide with the dashed line 39 indicating the target stiffness.

The bottom curve 41 in FIG. 6 indicates the angular step size or difference $\Delta\beta_i=\beta_{i+1}-\beta_i$ between to consecutive magnetic field vectors corresponding to two consecutive micro steps as a function of the current micro step number g..p. The direction $\beta_i$ of these magnetic field vectors was shown in FIG. 3 and gives the angular equilibrium position of the stepping motor driven by the given micro step current-vector, when no load is applied. These differences $\Delta\beta_i$ in FIG. 3 are clearly not equal. All 64 differences for a full turn add up to 360°, and therefore the real differences fluctuate around the dashed line indicating the target angular step $\Delta\beta_{AVG}$ of 360°/64=5.625°.

Both curves of FIG. 6 must be used to find at any micro step g..p the angle of the rotor relative to the stator where the magnetic field torque (MFT) of rotor and the external rotor load torque (RLT) are in equilibrium. This is done in FIG. 7. The vertical axis indicates the torque externally applied. Where the torque is zero, a horizontal axis, indicating the stator magnetic field angle (SMFA), is drawn. As stated above, the angle of equilibrium at zero torque coincides with the stator magnetic field angle. Thus, on this axis the values $\Delta\beta_i$ from the bottom curve of FIG. 6 can be taken over. The bigger distance between $\beta_g$ and $\beta_h$ is due to the value of $\Delta\beta_g$ in FIG. 6. The distance between $\beta_m$ and $\beta_n$ is the shortest because of the value of $\Delta\beta_m$ in FIG. 6. The relative position of the points $\beta_g..\beta_p$ can also be found by applying no torque to the stepping motor axis, apply the corresponding currents $I_x$ and $I_y$ to the stator coils X and Y and—after the rotor came to a standstill—measure the rotational position of the rotor axis of the stepping motor.

For each micro step x, the point of equilibrium for a specific rotor load torque RLT different from zero—$RLT_j$ corresponding to a specific speed zone as sketched in FIG. 5—depends on the zero torque equilibrium position $\beta_x$ and on the magnetic spring stiffness $\gamma_x$. The magnetic spring stiffness gives the slope of a line going by the zero RLT equilibrium point $\beta_x$. For a given positive torque RLT, mainly determined by the rotor speed as shown in FIG. 5, the points of equilibrium between the rotor MFT and the load RLT can be found as points $e_g..e_p$. The relative position of a point $e_i$ can also be found by applying to the shaft of the rotor of the stepping motor a constant torque RLT, apply the appropriate currents $I_x$ and $I_y$ corresponding to micro step number i to the X and Y stator coils of the stepping motor and measure the angular position of the rotor of the stepping motor. Due to the fact that both the slopes and offsets of the consecutive lines $MFT_g..MFT_p$, corresponding each to a specific micro step g..p, are not equal, the distances between points of equilibrium e.g. $e_i$ and $e_j$ of consecutive micro steps are different. These differences are thus due to:

(1) The variations of magnetic spring stiffness, which is proportional to the length $|H_i|$ of the magnetic field vector and gives a different slope to the lines in FIG. 7; and (2) The point of equilibrium for zero RLT, which coincides with the angle $\beta_i$ of the magnetic field vector and gives a different distance between the lines in FIG. 7 where the torque is zero. The difference between $e_g$ and $\beta_g$ is the lag $LAG_g$ as discussed in FIG. 4.

FIG. 8 shows what actually happens in the second order system we described in relation with FIG. 4, and further elaborated in FIG. 6 and FIG. 7. The vertically downward oriented axis gives the consecutive micro step numbers g, h, ... p and the corresponding time $t_0, t_1, ... t_9$ when they occur. The horizontal axis gives the rotor angle relative to the stator (RARS) for micro step $e_g ... e_p$. We suppose that at the moment $t_0$, micro step number g, there is an equilibrium between the rotor load torque (RLT), mainly caused by the dynamic friction $W_d$, and the magnetic field torque (MFT) caused by the lag $LAG_g$, shown in FIG. 7. At that moment a new current-vector $I_h$ is applied, that makes that $MFT_g$-line is not valid any more, but that $MFT_h$ must be taken for the period $[t_0,t_1]$. The equilibrium is disturbed now and results in a step response as shown between $t_0$ and $t_1$ on FIG. 8. At time $t_1$, the equilibrium is re-established. Because the distances (e.g. $[e_g, e_h]$ and $[e_h, e_i]$) on the RLT axis in FIG. 7 are different, so are the resulting angular steps step$_i$ ... step$_n$ of the rotor. This means that for the same time difference $\Delta t = t_1-t_0=t_2-t_1$ etc.. corresponding with a constant pulse rate with period T, a different angular step is obtained. The variations in step size give low frequency deviations from a quasilinear angular speed, resulting in vibrations, mainly with a period of four full steps. Experience with stepping motors reveals that the positional error is non-cumulative and averages to zero in four full steps, i.e. 360 electrical degrees. Every four steps the rotor returns to the same position with respect to magnetic polarity and flux paths. For this reason, when very accurate positioning is required, it is advisable to divide the required movement into multiples of four steps. This is known as the 4-step mode. In the case of our invention however, the resolution of micro steps is required. Thus every step must be corrected but the same correction sequence can be used after four full steps or 64 micro steps have been applied. It has been proven by measurements that the rotor has an equally deviation after four steps. This can be seen in the frequency spectrum, where the basic frequency is one per four steps.

In order to solve the problem of the fluctuating velocity, we describe below two methods. The first method of this invention—discussed in conjunction with FIG. 9, FIG. 10a, b,c and FIGS. 11a–11e—solves the problem for a specific value for the RLT by vector angle modulation (VAM). The second method of this invention—discussed in conjunction with FIG. 12 and FIG. 13a–13e—solves the problem more generally for a wide range of values for the RLT by vector angle and vector length modulation (VAVLM).

Figure 9:
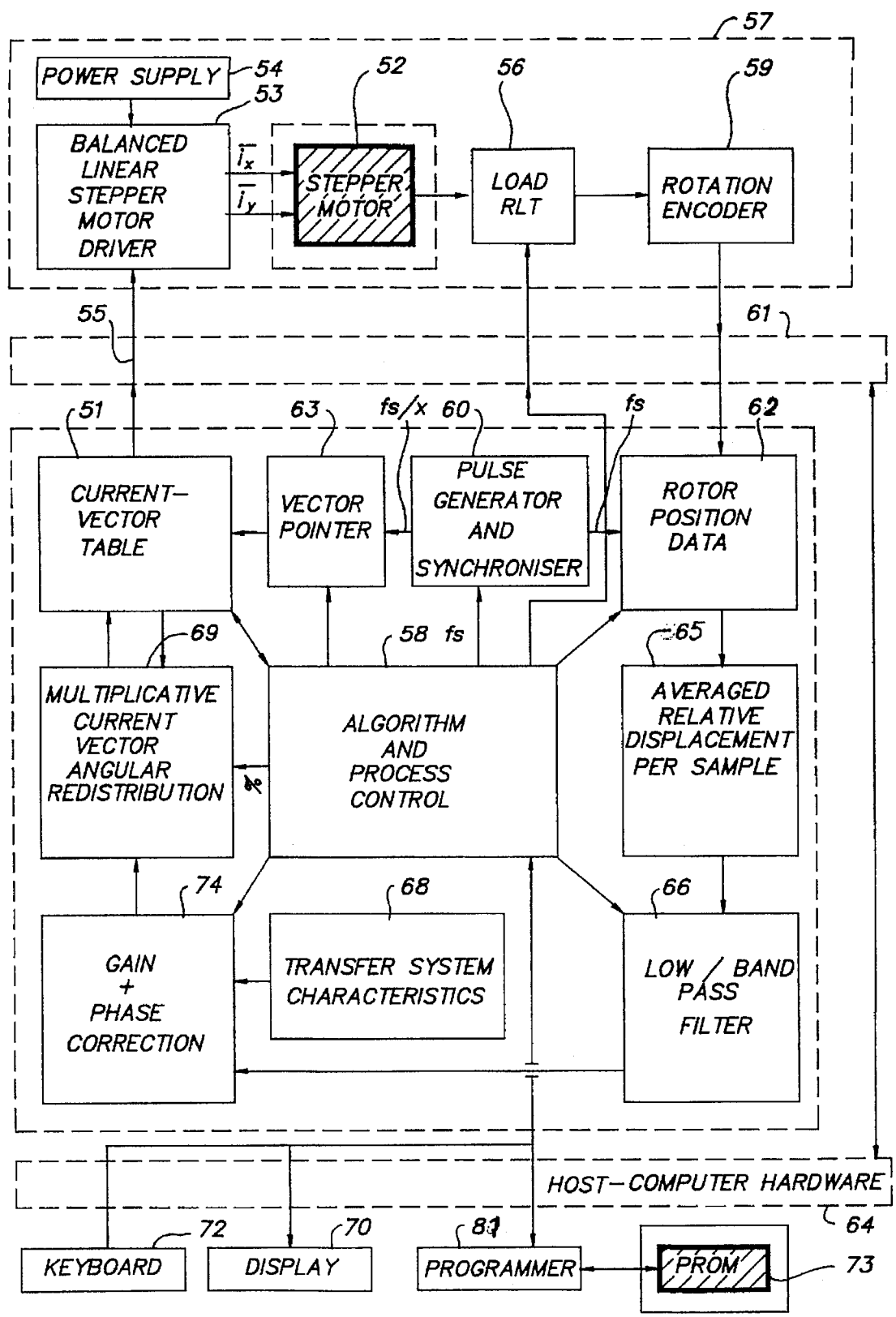
FIG. 9 is a schematic overview of a test rig and correction means for application of vector angle modulation (VAM) to the stepping motor signals.

Before the motor is mounted in the scanning apparatus the stepping motor is mounted on a test rig where it is coupled to a rotation encoder 59 as shown in FIG. 9. A pre-test is done to check whether the specific stepping motor on the test rig fulfils the minimal quality requirements, necessary for a successful correction. The test is performed dynamically, i.e. during rotation of the stepping motor. One could also measure the deviations statically, but it has been found that the motor behaves differently when operated statically rather than dynamically.

As shown in FIG. 9, the currents $I_x$ and $I_y$ for the stepping motor 52 are delivered by a stepping motor driver 53. A stepping motor driver 53 is a device receiving power from a power supply 54 and receiving digital current-vector control signals via a current-vector control line 55. Four current-vector control signals per micro-step i must be provided to the stepping motor driver 53. These are: $X_i$, $Y_i$, $S_{xi}$ and $S_{yi}$.

$X_i$ is linearly proportional to the current $I_x$.
$Y_i$ is linearly proportional to the current $I_y$.
$S_{xi}$ designates the sense or sign of the current $I_x$.
$S_{yi}$ designates the sense or sign of the current $I_y$.
The $X_i$ and $Y_i$ signals have typically a range from 0 to 127, where 0 corresponds with no current: $I_x=0$ or $I_y=0$; and 127 corresponds with maximum current $I_{max}$ or $I_0$, typically 1.66 Ampere. As such, both signals can be represented by a seven bit value. The signs $S_{xi}$ and $S_{yi}$ can each be represented by one bit. Practically, $S_{xi}$ and $X_i$ will be stored in one byte of eight bits and $S_{yi}$ and $Y_i$ will be stored in another byte. At a fixed frequency—this frequency is directly related to the desired angular speed of the stepping motor—consecutive 4-tuples ($X_i$, $Y_i$, $S_{xi}$, $S_{yi}$) are sent to the stepping motor driver 53. The eight bit data for $I_x$ and $I_y$ are effectively multiplexed over an eight bit parallel data line. Such a stepping motor driver 53 can be of several types:

- a regulated voltage driver. This is a rather simple device, but has the disadvantage that the current I doesn't reach the desired value immediately.
- a chopped current driver. Via a chopping system, the output current is programmed to fluctuate around the required current. The chopper itself is driven by a feedback system, fed by the output current.

A suitable driver for application of the method of this invention is the GS-D200M type driver, manufactured by SGS Thomson.

We suppose that this stepping motor driver 53 has an ideal behaviour, such meaning that it is balanced and linear. By balanced we mean that the driver must not be asymmetric. Asymmetry means that the same digital code values $X_i=Y_i$ give a different output current $I_x16\ I_y$. An asymmetric driver gives an elliptical current-vector diagram, even if the code values fulfil the equation $X_i^2+Y_i^2=127^2$, describing a circle. The elliptical current-vector diagram indicates that the stepping motor will accelerate twice per full turn of the current-vector and slow down twice per full turn. This behaviour creates vibrations with a basic frequency of FS/2.

By linear is meant that there is a linear relationship between the code values $X_i$, $Y_i$ and the resulting currents $I_x$, $I_y$: $I_x=a * X_i$, and $I_y=b * Y_i$. The balance requires that a=b.

Asymmetry is caused by the difference in driver circuitry for providing $I_x$ and $I_y$. A stepping motor driver which is not balanced and linear, would give a current-vector diagram different from that of FIG. 2. The vector endpoints would not be on a circle, and the angle between two consecutive vectors would not be equal. Such a stepping motor driver can be made linear and balanced by measuring on the stepping motor driver connected to the stepping motor the output currents $I_x$ and $I_y$ when the appropriate inputs are activated with the digital signals $X_i$ and $Y_i$. A compensation table for $X_i$ and a compensation table for $Y_i$ can be derived from these measurements. This table translates uncorrected codes $X_i$ or $Y_i$ to compensated codes $X'_i$, $Y'_i$. Commonly the negative currents $I_x$ or $I_y$ are generated by the same circuitry as the positive currents. In that case it is sufficient to measure the positive currents only. By using the same conversion for the negative currents as for the positive currents, all currents are properly compensated to behave linearly and balanced.

We suppose that the stepping motor driver is corrected by any means such that it behaves linearly and balanced. As such, the corrections that are found by the method of this invention will be stepping motor specific, and not biased by stepping motor driver specific imperfections. Although the method can also be applied to a non-corrected non-balanced and/or non-linear stepping motor driver. In that case, the stepping motor 52, the PROM 73 and the stepping motor driver 53 must be treated as one non-separable kit.

As said, we suppose to have a balanced linear stepping motor driver 53 to apply the method of this invention. Because the stepping motor driver is linear and the control codes $X_i$ and $Y_i$ can take 127 discrete levels, we can generate 127 different positive current levels $I_x$, the difference between two consecutive current levels being constant. The same applies for the current levels $I_y$. Initially the programme of $I_x$ and $I_y$ current vectors is designed to cause a uniform rotation for a hypothetical motor.

The $X_i$ and $Y_i$ codes, for generating current-vectors $I_i$ as close as possible to the vectors in the diagram of FIG. 2, are given in table III. This table gives the values for the first nine steps, i.e. from step $0=0°$ to step $8=45°$, and one extra step 9. Steps 9 through 16 can be found by merely swapping $X_i$ and $Y_i$, and reading the table in reverse order, as can be deduced by comparing step 7 with step 9. The control codes for micro steps 17–32 are found by changing the sign of $X_i$ and filling the table by reading it in reverse order. Control codes for micro steps 33–63 are found by changing the sign of $Y_i$ and filling the table by reading it in reverse order. In fact, only the absolute values for $X_i$ and $Y_i$ are stored in the memory means, and the sign for $X_i$ and $Y_i$ is indicated by the sign control signal $S_{xi}$ and $S_{yi}$ respectively. In table III we give also a difference $\Delta L$ between the theoretical length (127) and the real length due to discretisation in 127 levels. If the ($X_i$,$Y_i$) vector is too short, the difference is negative, otherwise it is positive. It can be seen that the absolute value of this difference is always less than 1. This means that the length of the real current vector is substantially equal to 127. We give also the difference $\Delta\alpha$ between the real angle and the theoretical angle $(90°* i/16)=5.625°* i$. If the real angle is too small, the difference is negative, otherwise it is positive.

TABLE III

| | Quantized current levels for basic micro stepping | | | | | | | | |
|---|---|---|---|---|---|---|---|---|---|
| Step | 0 | 1 | 2 | 3 | 4 | 5 | 6 | 7 | 8 | 9 |
| $X_i$ | 127 | 126 | 125 | 122 | 117 | 112 | 106 | 98 | 90 | 81 |
| $Y_i$ | 0 | 12 | 25 | 37 | 49 | 60 | 71 | 81 | 90 | 98 |
| $\Delta L$ | 0.0 | −.43 | 0.48 | 0.49 | −.15 | 0.06 | 0.58 | 0.14 | 0.28 | |
| $\Delta\alpha°$ | 0.0 | −.18 | 0.06 | 0.00 | 0.22 | 0.05 | 0.06 | 0.20 | 0.00 | |

Table IV gives the polarity, sense or sign $S_{xi}$, $S_{yi}$ for four ranges of micro steps:

TABLE IV

Sense of current w.r.t. micro step numbers for basic micro stepping

| Steps i = | 0–15 | 16–31 | 32–47 | 48–63 |
|---|---|---|---|---|
| $S_{xi}$ | + | − | − | + |
| $S_{yi}$ | + | + | − | − |

The values in the above two tables III and IV, constituting four full steps, are stored in the current-vector table 51 for the first run of the stepping motor.

When the above described sequence of 64 codes ($X_i$, $Y_i$, $S_{xi}$, $S_{yi}$) is sent over and over again to the balanced linear stepping motor driver 53 at a fixed and constant rate of 16*FS, the stepping motor will perform a full turn after 6400 codes are sent in a 400 steps stepping motor.

Although the control codes of table III approximate fairly well the theoretical ideal micro step driving signals sketched in FIG. 2, due to the stepping motor specific imperfections, the stepping motor starts vibrating. It is now the purpose of the invention to correct these vibrations that repeat each time the current-vector made a full turn around the circle. This corresponds with 64 code vectors ($X_i$, $Y_i$, $S_{xi}$, $S_{yi}$). Such type of vibrations have a base frequency of FS/4. The higher harmonics are 2*FS/4, 3*FS/4, 4*FS/4, etc. It is the purpose of the invention to eliminate the vibrations with these frequencies, up to 8*FS, being half the frequency of the stepping motor driver pulse rate. With a system driven by a 16*FS pulse rate, it is theoretically possible to correct vibrations with a frequency up to 8*FS. In scanners where one scan line corresponds to four micro steps, it is sufficient to filter frequencies up to 4*FS. Higher order vibrations will be invisible in the scanned data because these fluctuations are integrated over the line-time-integration of the photosensitive system.

To eliminate said vibrations we must first measure them and quantize the contribution to each said frequency. Moreover, the contribution of each frequency depends on the load RLT (Rotor Load Torque). As will be discussed in conjunction of FIG. 11a–11e, the first method of this invention described here eliminates vibrations for a known load torque RLT. Therefore we built in the electro-magneto-mechanic process 57 of FIG. 9 a Load RLT device 56. This load RLT device enables us to impose a fixed load torque on the stepping motor 52. The load RLT device 56 can be manually set or controlled electronically by the algorithm and process control device 58. The load RLT is applied to a wheel (not shown) mounted on the rotor axis of the stepping motor 52. Said wheel also touches via a homo-kinetic contact the wheel mounted on the axis of a rotation encoder 59.

Because of the variable load RLT device 56, we are relieved from the need to run the stepping motor at the same speed as it runs in the final device to obtain the same RLT as in reality, the RLT clearly being dependant from the drive speed as shown in FIG. 5. We can merely select the speed of the rotor as to optimize the measuring conditions of the system. In fact, we must make sure that the frequencies we want to measure and correct are well below or beyond the frequency where the system—formed by the rotor of the stepping motor, the rotor axis, the wheel mounted on the rotor axis, a brake-block on said wheel for applying the variable load RLT, and the rotation encoder coupled with friction to the rotor axis wheel—has its resonance frequency.

We found by intentionally exciting the system the resonance frequency at 120 Hz. If we try to stay above that frequency, the stepping motor would need to turn too rapidly, maybe even out of specification. Therefore we decided to make the highest possible frequency to be corrected 8*FS smaller than 120 Hz.

This can be achieved by the rotor of the stepping motor 52 describing a full turn in forty seconds. This means that the micro steps have a frequency of 6400/(40 s)=160 Hz=16*FS. The FS frequency is thus 10 Hz; the highest frequency that can be corrected 8*FS=80 Hz. This makes that the whole range of frequencies that can be corrected: [FS/4,8*FS] or [2.5 Hz, 80 Hz] is out of the range of frequencies where the system comes in resonance. By staying that far from the resonance frequency, we are sure that the system responds in a linear way, with the same amplitude response, to all frequencies we are interested in. The amplitudes we find by filtering the signals can thus be used in the same manner for all frequencies. In the examples summarized in tables V and VII, one can will see that the most important frequencies are well below 120 Hz.

Moreover, by staying well away from the resonance frequency of 120 Hz, the phase shift of the response signal relative to the input signal is also the same over all frequencies in the range [FS/4,8*FS].

The rotation encoder 59 reacts to the angular displacement of the stepping motor axis by issuing electrical pulses. The type of rotation encoder can be an interferometric encoder with quadrature detection, such as the Canon R-10 or R-1L encoder. The grating of this type gives 81,000 on/off square-wave pulses per revolution. By quadrature detection, this gives 4*81,000 useful pulses per turn, plus an indication of the direction of rotation. This is necessary because it can be seen from the overshoots in FIG. 8 that the motor doesn't necessarily always rotate in the same sense. Moreover, the diameter of the wheel mounted on the shaft of the stepping motor 52 is about five times bigger than the diameter of the wheel mounted on the shaft of the encoder 59. This means that for every full turn of the stepping motor, the encoder issues 5.4346*4*81,000=1,760,800 pulses or 1,760,00/6,400=275 pulses per micro step. The process interface hardware 61 increments (or decrements depending on the sensed direction of rotation) a counter (not shown) each time it receives a pulse. This counter is sampled at a fixed frequency $f_s$. The algorithm and process control device 58 sends a value for the sampling or base frequency $f_s$ to the pulse generator and synchroniser 60. The pulse generator and synchroniser 60 generates a pulse train with a frequency of $f_s$=960 Hz. This frequency must be well above the theoretical Nyquist frequency to correct vibration signals up to 80 Hz. By taking it 12*80 Hz=960 Hz or six samples per micro step, this condition is surely fulfilled. For every sample, the counter is incremented with a value of about 275/6=46. The pulse train $f_s$ is sent to the rotor position data device 62, that samples the counter (not shown) in the process interface hardware 61 at the frequency rate $f_s$. The pulse generator and synchroniser 60 generates at the same time a pulse train at a rate of $f_s/x$, where we have chosen x=6. That pulse train has a frequency of 160 Hz or the selected micro step frequency for the test and is sent to the vector pointer device 63. The purpose of the vector pointer device 63 is to generate, at the rate of the micro step frequency $f_s/x$, sequentially index numbers i ranging from 0 to M−1. As said above, M is 64 for 4*FS correction and M is 6400 for full rotor turn correction. These index numbers i point in the current-vector table 51 to the appropriate ($X_i$, $Y_i$, $S_{xi}$, $S_{yi}$) control codes. In the case of 4*FS correction, sixty four control codes are stored in the current-vector table 51. During the first test these values are the theoretically ideal values from the tables III and IV above. Said control codes are sent to the balanced linear stepping motor driver 53, that translates the digital control codes ($X_i$, $Y_i$, $S_{xi}$, $S_{yi}$) to the current-levels $I_x$ and $I_y$, that are applied simultaneously and for a duration of one micro step to the stepping motor 52. These currents cause the rotor of the stepping motor 52 to rotate. The rotation of the shaft of the rotor causes the rotation encoder 59 to generate pulses that make the counter (not shown) to be incremented or decremented. The value of that counter is read or sampled six times per duration of a micro step at the above mentioned frequency $f_s$ and the values of the counter are stored in the rotor position data device 62.

In parallel to the counter, we connected an FFT analyzer (not shown) to the rotation encoder 59 via an analog electronic frequency-voltage converter that translates the frequency of the pulses and rotation direction information from the rotation encoder 59 linearly to a voltage V, that was fed into an FFT analyzer. That way the voltage V was a linear function of the angular velocity of the rotor of the stepping motor 52. We found for an uncorrected motor local maxima for the amplitude A (in [mV]) of the voltage signal at some frequencies (in [Hz]), given by the values in table V. Remember that FS/4=2.5 Hz.

in the transfer system characteristics table 68. It has been found that $\psi$ is about 5°. After frequency dependent gain and phase adjustment of the averaged filtered relative displacement values, a multiplicative current-vector angular redistribution in a 4 FS window can be done. Hereto, the uncorrected $X_i$ and $Y_i$ codes are fetched from the current-vector table 51 by the redistribution unit 69. Based on the data coming from the gain and phase correction unit 74, new ($X_i$, $Y_i$, $S_{xi}$, $S_{yi}$) codes are generated such that the vector length is still 127, but the angles between two consecutive vectors ($X_i$,$Y_i$) can be different for each vector pair. Another restriction is that all redistributed angles must add up to 360°. The new codes are then fed back into the current-vector table 51. Because the new current-vector angles are $\alpha'_i$ and the amplitude is 127, the new codes are found from the equations:

$$x'_i = 127 * \cos \alpha'_i \qquad \text{(III.a)}$$

$$y'_i = 127 * \sin \alpha'_i \qquad \text{(III.b)}$$

The whole procedure for the first iteration as described above basically corresponds to measuring the local displacements each time a new micro step is applied, low pass filtering to keep only the base component of the non-linear

TABLE V

| Frequency spectrum for uncorrected stepping motor | | | | | | | | | |
|---|---|---|---|---|---|---|---|---|---|
| F Hz | 2.5 | 5.0 | 7.5 | 10.0 | 12.5 | 15.0 | 17.5 | 20.0 | 22.5 | 25.0 |
| A mV | 5.2 | 1.2 | 3.5 | 22.6 | 1.0 | 14.0 | 5.0 | 24.1 | 3.5 | 21.0 |
| F Hz | 27.5 | 30.0 | 32.5 | 35.0 | 37.5 | 40.0 | 42.5 | 45.0 | 47.5 | |
| A mV | 1.4 | 33.4 | 3.7 | 33.7 | 3.5 | 25.6 | 5.6 | 29.1 | 7.6 | |

As can be seen from table V, the first big amplitude shows up at FS frequency of 10 Hz.

Because the response of the motor/load system is not fully linear, there is no sense in attempting to eliminate the vibrations in all above maxima of the frequency spectrum simultaneously. This would introduce or increase vibrations at the lowest frequencies, which is unacceptable. Therefor, we start to attack the maxima at the lowest frequencies first, located at 2.5 Hz. This is done as follows.

For one full turn of the rotor, we dispose over 6400*6= 38400 sampled values from the counter, because the micro steps are six times oversampled. These samples are split in 100 packets. Each packet has 384 consecutive samples, corresponding with one full turn of the current-vector, this is 4 FS or 64 micro steps. In each packet, the counter differences—relative to the previous counter value—are computed. These differences are averaged over the 100 packets, by adding the 100 differences of the corresponding samples in each packet. That way we get 384 values for the averaged relative displacement per sample in a 4 FS window 65. In order to select just the 2.5 Hz component of the vibration, these 384 values are filtered by a zero phase shift low pass filter 66. For the first iteration, the cut off frequency of the filter is selected by the algorithm and process control device 58 such that the 2.5 Hz component is not attenuated and all higher harmonics—5 Hz, 7.5 Hz etc..—are eliminated. The filtered data are fed into a gain and phase correction unit 74. The frequency dependent gain A and phase shift $\psi$ to be applied to the filtered data from the low pass filter device 66, are found once prior to the motor tests by characterising the test system. The gain and phase shift are stored per specific frequency in the range [2.5 Hz, 80 Hz]

variations, increasing the current-vector angle $\alpha_i$ to $\alpha'_i$ if the local displacements were too small and decreasing the current-vector angle if the local displacements were too large. This way the reverse vibration is imposed on the input of the system, such that the base vibration at the output vanishes.

At this moment, a second run of the motor and a second iteration of the above described procedure can be done. By analysis of the data of the second run, one finds that the vibrations have a lower amplitude at a frequency of 2.5 Hz, while higher frequencies are still present. This will be discussed in conjunction with table VII. The same procedure is followed, but the low pass filter cuts off the frequencies higher than 5 Hz. In the same way as for the first redistribution, the current-vectors are redistributed based upon the acquired data. The codes in the current vector table that were already redistributed to improve the behaviour at a frequency of 2.5 Hz, are fetched from the current vector table and redistributed again based upon the data from the gain and phase correction unit 74 to improve the behaviour at 5 Hz. A further elimination of vibrations at frequencies at 2.5 Hz and a serious improvement of vibrations at 5.0 Hz results.

The whole procedure is iterated for the frequencies 2.5 Hz, 5.0 Hz, 7.5 Hz, etc.. The results can be interactively monitored by an operator looking at a display 70. As soon as an iteration gives results within the required tolerances or after a fixed number of iterations e.g. up to 4*FS corresponding to one scan line, the operator can stop the iterations via the keyboard 72. A valid stop criterium can be formed by testing a weighted sum of the amplitudes that correspond with the frequencies that have been corrected so far. The weights can be chosen to emphasize certain critical frequencies. Normally the base frequency and lower harmonics get higher weight values than the higher harmonics. As long as the sum of the weights equals 1, said sum decreases in solar the system can be improved considerably. As soon as that sum starts to fluctuate around a minimum value, the iteration process can be stopped.

After the last iteration, the algorithm and process control unit 58 downloads the $(X_i, Y_i, S_{xi}, S_{yi})$ codes stored the current-vector table 51 via the host computer hardware 64 and via the PROM programmer 81 to the PROM 73. The programmed PROM 73 together with the motor now forms a matched pair for a corrected stepping motor, the PROM containing the target $(X_i, Y_i)$ vector data and thus being programmed to match the specific motor under test.

Every specific stepping motor is mounted on the test rig and gets its specific PROM that contains the compensation codes for said specific stepping motor. The total cost of the PROM and the stepping motor kit is about 5% more than the cost of the uncorrected motor alone. Compared to the 30% loss of stepping motors, apart from the overall quality improvement, this gives serious savings in production cost. This is also less expensive than the introduction of gearwheels or heavier components.

For the uncorrected specific motor that gave the frequency/amplitude table V, the frequency spectrum of the vibrations after correction gave the values displayed in table VI:

The first line of the amplitude values A-1 gives the relative amplitudes of the specific frequency component for a specific uncorrected stepping motor. The first iteration mainly reduces the amplitude at the frequency of 2.5 Hz. As can be seen in row A-2, the relative amplitude is drastically decreased to a value of 3.7. Other frequencies are not too much influenced by this operation. The improvement at 5.0 Hz is occasional, because values around 1.0 or lower have no real big meaning and don't influence the behaviour of the stepping motor. The second iteration aims to improve the amplitude at 5.0 Hz. The result can be seen in line A-3 of table VII. The result is that the amplitude at 2.5 Hz is further improved, the result at 5.0 Hz seems to be worse, but as said above that low value is not very relevant. The third iteration makes the steps from row A-3 to A-4 and the purpose is to reduce the amplitude of the vibration component at 7.5 Hz. It can be seen that it is reduced with a factor two. Next we correct for the component at 10 Hz or FS frequency. The relative amplitude improves from 12.4 to 4.5. The iterations are stopped as soon as the improvement is satisfactory for the requested dynamic quality of the stepping motor.

FIG. 10a shows how the calibrated system—consisting of the specific XY-vector PROM 71 and the specific stepping motor 75—is incorporated in the scanner system in particular or more generally in any system—loading the rotor with a specific inertia and friction 86—using a stepping motor to create a linear or angular rotation at a constant speed over a certain time duration. The circuitry for providing the current

TABLE VI

| Frequency spectrum for corrected stepping motor | | | | | | | | | |
|---|---|---|---|---|---|---|---|---|---|
| F Hz | 2.5 | 5.0 | 7.5 | 10.0 | 12.5 | 15.0 | 17.5 | 20.0 | 22.5 | 25.0 |
| A mV | 1.8 | 1.2 | 3.1 | 1.8 | 1.6 | 1.2 | 4.3 | 1.8 | 5.3 | 5.3 |
| F Hz | 27.5 | 30.0 | 32.5 | 35.0 | 37.5 | 40.0 | 42.5 | 45.0 | 47.5 | |
| A mV | 4.5 | 12.5 | 14.3 | 22.5 | 15.9 | 19.6 | 23.3 | 15.1 | 23.1 | |

By comparing table VI with table V corresponding to the uncorrected stepping motor, it is clear that serious improvements are realised for the vibrations at frequencies of 2.5 Hz, 10 Hz, 15 Hz, 20 Hz, 25 Hz, where most components had an amplitude above 20 mV. All amplitudes are reduced to a value well below or slightly above 5 mV. At some higher, uncorrected frequencies the amplitude increases but less dramatically than the positive changes in the lower corrected frequencies. The improvement reaches a factor ten or more for the FS, 1.5*FS and 2*FS frequencies.

As discussed above, the corrections are done iteratively, first decreasing the amplitude of the vibrations with frequency FS/4, then FS/2, then 3*FS/4 etc. Table VII is compiled from such iterations and gives an idea of the relative improvement per step.

in the motor driving circuit includes a Programmable Read-only Memory designated as a "specific XY-vector PROM" 71. The PROM contains information which predetermines the currents $I_x$ and $I_y$ to be fed to the motor. This PROM contains a copy from the signals in the final "Current-vector table" 51, as shown in FIG. 9, where this table has been constructed iteratively. The current-vector table 51 in FIG. 9 contains a table of motor specific current-vectors $(I_x, I_y)_i$, such that driving the stepping motor by a sequence of these stored current-vectors results in an almost constant angular speed.

A clock or pulse generator (not shown) generates a sequence of a micro step pulses 77 at a constant rate. These pulses are sent to the vector pointer control unit 76 that has the function to generate counter signals counting circularly

TABLE VII

| Frequency spectra for subsequent correction iterations | | | | | | | | | |
|---|---|---|---|---|---|---|---|---|---|
| F Hz | 2.5 | 5.0 | 7.5 | 10.0 | 12.5 | 15.0 | 17.5 | 20.0 | 22.5 | 25.0 |
| A-1 | 10.5 | 0.9 | 2.5 | 10.9 | 0.5 | 5.1 | 1.2 | 5.3 | 0.6 | 4.2 |
| A-2 | 3.7 | 0.2 | 2.6 | 12.8 | 0.2 | 5.6 | 1.7 | 5.8 | 0.7 | 3.2 |
| A-3 | 1.1 | 1.2 | 2.1 | 12.3 | 0.7 | 4.6 | 2.2 | 5.6 | 1.0 | 3.5 |
| A-4 | 0.4 | 0.4 | 1.2 | 12.4 | 0.2 | 4.3 | 1.8 | 6.1 | 1.9 | 3.2 |
| A-5 | 1.5 | 0.3 | 0.5 | 4.5 | 1.2 | 3.9 | 2.5 | 5.3 | 3.3 | 1.6 |
| A-6 | 2.8 | 0.1 | 2.0 | 2.6 | 0.8 | 4.8 | 2.1 | 5.9 | 2.2 | 3.8 | from 0 to 63 and restart from 0. An optional control signal CW/CCW 78 can instruct the vector pointer control device to count forward 0, 1, . . . 63, 0, 1, . . . or to count backward 0, 63, 62, . . . , 0, 63, . . . This enables to operate the stepping motor 75 in clockwise and counter clockwise mode. If the control signal CW/CCW 78 is not present, the stepping motor can have only one direction of rotation. Another optional signal is the SYNC signal 79. This signal is necessary only if the motor correction is computed for a full turn, 100 FS or 6400 micro steps. In that case, the vector pointer control unit 76 generates numbers ranging from 0 to 6399 and is reset to zero each time the SYNC signal 79 is active. The SYNC signal 79 can be derived from the position of the shaft of the stepping motor 75 in the following way. On the shaft of the rotor of the stepping motor 75, an optional synchronisation disk 82 is mounted. This synchronisation disk 82 gives an electronic pulse to a synchro pulse generator 83 each time when a synchroniser mark 84 on the synchronisation disk 82 passes a mark detector 85. Each time the synchro pulse generator 83 receives an electronic pulse, it generates a SYNC pulse 79 for the vector pointer control unit 76. By using the SYNC signal, the stepping motor can be corrected for a full turn of the rotor instead of just four full steps. In the above described measurement and correction procedure of FIG. 9, the rotor position data in block 62 are not averaged over hundred 4 FS-windows to be stored in block 65, but are kept as they are. From block 66 on, 38400 data elements are processed. In that case, M=6400 current-vector values will traverse 100 times the perimeter of a circle, such that these values are close to:

$$I_{xi} = I_0 * \cos(360° *i/N) \quad \text{(IV.a)}$$

$$I_{yi} = I_0 * \sin(360° *i/N) \quad \text{(IV.b)}$$

In these equations, N=64, which is an integer divider of M=6400.

Another optional input for the vector pointer control device 76 is the RLT control signal 80. This gives an indication of the expected or measured rotor load torque. Depending on ranges for RLT, the vector pointer control device 76 can add constant offsets to the counter signals generated by the vector pointer control device 76. In that case, the XY-vector PROM 71 contains a table of XY-values for each specific value of RLT, corresponding to a drive speed range as illustrated in FIG. 5.

The XY-vector PROM 71 generates for every micro step pulse 77 a 4-tuple $(X_i, Y_i, S_{xi}, S_{yi})$ to the balanced linear stepping motor driver 87, which is fed also by a DC power supply 88. The stepping motor driver 87 generates the $I_x$ and $I_y$ currents necessary to drive the stepping motor 75.

In FIG. 10b, we show the full rotor excitation spectrum 89 and in FIG. 10c the low frequency part of the rotor excitation spectrum 90. The rotor excitation spectrum shows the amplitude (vertical axis) of the vibrations in the different frequency components (horizontal axis). The theoretical mechanic response of a loaded rotor is shown in the solid line 91 in FIG. 10b. Due to motor imperfections, a whole spectrum 92 of vibrations appears. Due to micro stepping the high amplitude peaks at $1*f_{MS}$, $2*f_{MS}$, $3*f_{MS}$, . . . are introduced and the spectrum 92 is folded symmetrically around these axes. Herein is $f_{MS}$ the micro step frequency or 16*FS in the preferred embodiment of the current invention.

The diagram in FIG. 10c stretches the $0-0.5*f_{MS}$ part of the horizontal axis. The dashed line 93 gives the amplitude of the vibrations at different frequencies for an uncorrected stepping motor under basic micro stepping. The solid broken line 94 gives the frequency spectrum of the vibrations of the same motor, driven by corrected current-signals. The maximum correction area ranges from 0.25*FS to $0.5*f_{MS}$, being 2.5 Hz to 80 Hz for the preferred embodiment. The system is effectively corrected for frequencies ranging from $0.25*FS$ to $i*f_{MS}$. This corrected area is thus smaller than the theoretically maximum correction area and depends on the number of iterations in the correction process.

FIG. 11 shows the electrical and magnetic process of a VAM-corrected (Vector Angle Modulation) stepping motor. In FIG. 11a, the (time,micro step) diagram 95 shows the output of the vector pointer control unit 76 as a function of the time. On the horizontal time axis, time steps with constant time intervals Δt are shown. On the vertical micro step count axis, the micro step number, generated by unit 76, is shown. In our preferred embodiment, "last" equals 64 for a stepping motor corrected for a 4*FS-window and equals 6400 for a stepping motor corrected for a full rotor turn.

The micro step numbers [0,last-1] are fed to the VAM-corrected PROM 96, specific for one stepping motor. This PROM could also get a signal 97 specifying the rotor speed or the corresponding rotor load torque (RLT) value.

The PROM 96 together with the stepping motor driver (not shown) generate current-signals ($I_x$, $I_y$) that are VAM-modulated. In FIG. 11b, the diagram 98 shows the VAM-modulated current-vectors I with endpoints on a circle. That means that the length |I| of the current-vector I is constant. The angular differences Δα between two current-vectors corresponding to two consecutive micro steps are not constant over all micro steps but are modulated.

In the stepping motor 99, the current-signals $I_x,I_y$) give a distorted magnetic field vector as shown in diagram 100 in FIG. 11c. The magnetic field vectors H of different micro steps are not on a circle, meaning that their length |H| fluctuates. The angular difference Δβ also fluctuates per micro step. The load 101 of the stepping motor induces a specific rotor load torque that depends on the rotor angular speed. From the (RARS, Torque) curve 102 in FIG. 11d it is clear that the goal has now been reached for a specific torque RLT. The differences Δδ between consecutive angular points e of equilibrium between the specific external load RLT and the rotor magnetic field torque (MFT) are now constant. That means that each micro step the rotor will rotate over a constant angle Δδ. Because each new micro step occurs after a constant time Δt, the angular speed of the rotor Δδ/Δt will be constant. This gives the dashed straight line 103 in the (time, rotor angle) in FIG. 11e, that connects the angular rotor positions at the start of a micro step.

From the same (RARS,Torque) curve 102 in FIG. 11d it is also clear that the differences Δδ are not constant for a bigger or smaller torque RLT. Moreover, said differences will be completely different for an RLT having the same magnitude but an opposite sign. This situation occurs if the stepping motor rotates in the opposite direction with the same speed.

It is thus clear that the above described method for eliminating the vibrations fulfils the object for a device operated at a known fixed angular speed and orientation of rotation. These parameters must be known before the calibration of the motor starts. Most devices in which a stepping motor is built in need the precise operation only for a limited range of velocities and one direction. There are systems however that require a vibration free motion in both directions, sometimes with the same speed or speed range, sometimes for all speeds between two large limits.

Therefore, an improved method is described below to more accurately control the stator currents $I_x$ and $I_y$ in order to make the vibrations of the corrected stepping motor indifferent to the orientation of the speed. To make the control codes ($X_i$, $Y_i$, $S_{xi}$, $S_{yi}$)

independent of the external load applied to the rotor shaft of the stepping motor, it is necessary and sufficient to correct the magnetic spring stiffness at every micro step and correct the angular equilibrium point of the consecutive micro steps at zero load torque. An ideal stepping motor has a constant magnetic spring stiffness and equal angular steps for the 6400 micro steps constituting a full turn of the rotor.

Figure 12:
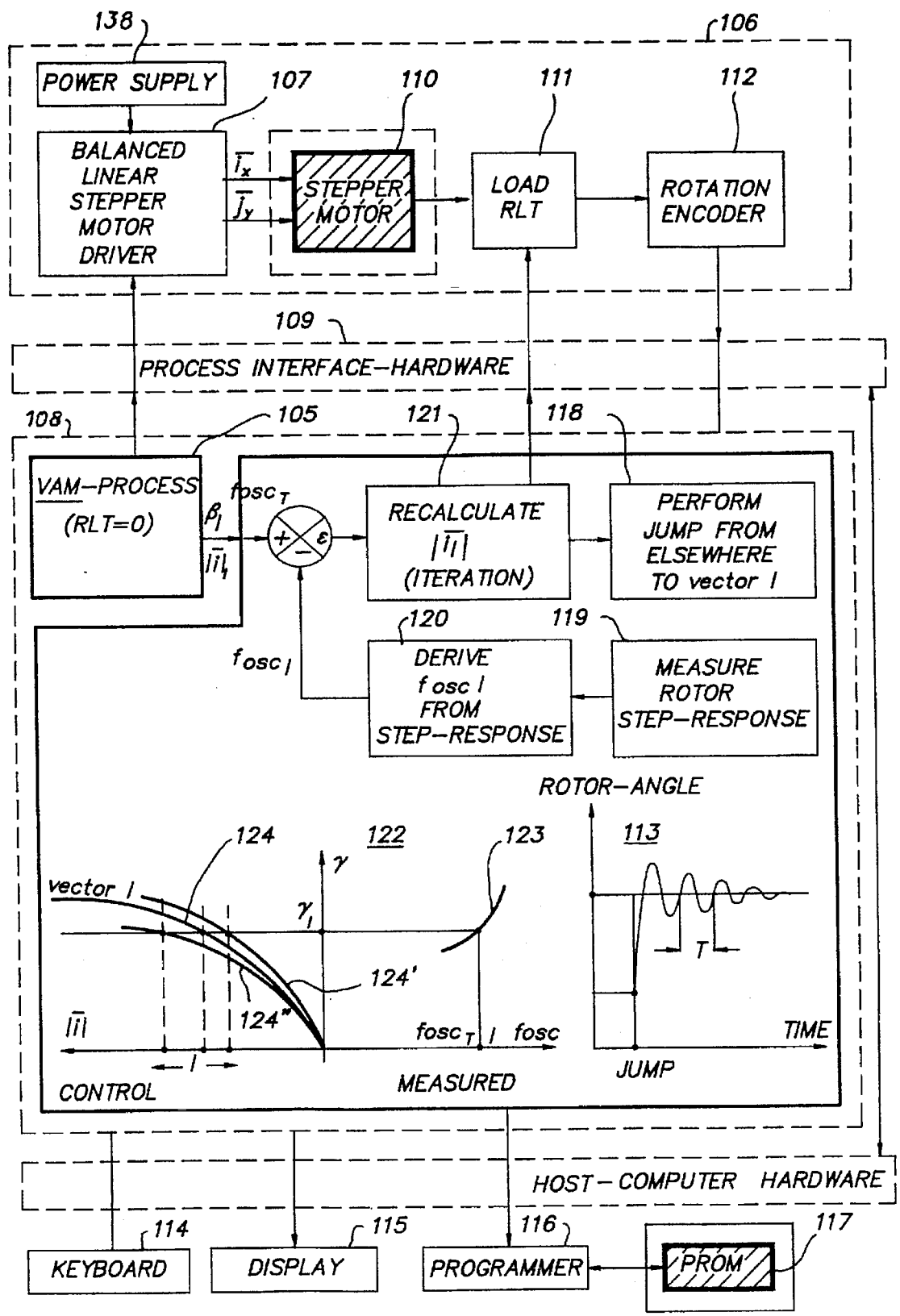
FIG. 12 is a schematic overview of a test rig and correction means for application of vector angle modulation and vector length modulation (VAVLM) to the stepping motor signals.

In FIG. 12 the test rig and iterative correction system of FIG. 9 is extended to perform VAVLM correction, i.e. Vector Angle and Vector Length Modulation. First of all the VAM-process 105 as described in FIG. 9 is applied to find the optimal angle distribution for all micro steps 1=0 . . . 63. The rotor load torque (RLT) is taken zero for this VAM correction. This way, the stator magnetic field angle steps $\beta_1$ at RLT=0 shown in FIG. 7 are made equal to each other. This is different from what is shown in the (torque,RARS) diagram 102 of FIG. 11d, where the differences $\Delta\delta$ are constant at a non-zero rotor load torque. But the correction signals can be found in the same manner as described in conjunction with FIG. 9, now by selecting the rotor load torque zero. In this first VAM correction step, the current-vector angles $\alpha_i$ shown in FIG. 2 are modulated such that the magnetic field vector angle differences $\Delta\beta_i$ shown in FIG. 3 basically don't fluctuate or more exactly that in FIG. 7 the distance between two consecutive intersections of the $MFT_i$ curve with the zero load torque axis (Torque=0) is always constant. After this VAM step has been performed, a VLM (current-Vector Length Modulation) step will be done. As in FIG. 9, the electro-magneto-mechanic process 106 consists preferentially of a balanced linear stepping motor driver 107 that receives ($X_i$, $Y_i$, $S_{xi}$, $S_{yi}$)-codes from the VAVLM correction unit 108 via the process interface hardware 109. The driver 107 gets DC power from power supply 138 and generates current-signals $I_x$ and $I_y$ that drive the stepping motor 110. A mechanical friction system 111 can impose a rotor load torque (RLT) on the spindle of the rotor. A rotation encoder 112 coupled to the axis of the stepping motor gives the rotor angular position via electronic pulses.

The basic idea for performing VLM is to make the slopes $\gamma_i$ of the MFT-curves shown in FIG. 7 equal to each other. That will make sure that the distances $\Delta e_i$ between the points of equilibrium will be equal to each other for any value of the rotor load torque (RLT). As discussed before, the value of $\gamma$ determines the magnetic spring stiffness, which is almost a linear function of the current-vector length. In order to influence $\gamma$, we can modulate the current-vector length $|I_1|$. To know whether said length $|I_1|$ must be increased or decreased and how much, we must measure the magnetic spring stiffness of the system at the appropriate equilibrium position $\beta_1$. From the theoretical analogy to a damped mass-spring second order system, we can compute the magnetic spring stiffness k from the oscillation frequency of the system after excitation. The correction process can be described by the following steps:

(1) Perform a jump from any position to vector number 1 with length $|I_1|$ : block 118.

(2) Measure the rotor step response caused by step (1): block 119.

(3) Derive the oscillation frequency from the step response measured in (2): block 120.

(4) Recalculate the vector length $|I_1|$ in order to adjust the oscillation frequency $Fosc_1$ to a target frequency $Fosc_T$: block 121.

The excitation causing a jump is done by applying suddenly to the stepping motor a current $I_1$, with components $I_x$ and $I_y$, with current-vector angle $\alpha_1$, causing the equilibrium position $\beta_1$. The jump causes the stepping motor to oscillate around the equilibrium position. This oscillation is monitored by the rotation encoder 112, that increments and decrements a counter (not shown) according to the motion. That counter is sampled at a frequency $f_s$=960 Hz. Once the stepping motor 110 reached the equilibrium position, the counter will take a final value. The period T of this oscillation can be identified by looking in the sequence of sampled counter data to two consecutive points where the final counter value is reached coming from a previous lower value. In the (time, rotor angle) diagram 113 this is indicated by the period T. The oscillation frequency can be found from the equation: $Fosc_1$=1/T. If the measured frequency $Fosc_1$ is too high, i.e. higher than a target frequency $Fosc_T$, the vector length $I_1$ must be decreased, while keeping the same angle $\beta_1$. If $Fosc_1$<$Fosc_T$, the vector length $I_1$ must be increased. This can be summarised as:

$$|I'_1| = |I_1| + \epsilon * (Fosc_T - Fosc_1) \qquad (V)$$

The factor $\epsilon$ is a gain value that must be properly chosen for the iterative recalculation of the length of the current-vector $|I_1|$.

Similarly, as described in FIG. 9, the operator in FIG. 12 has interactive control over the correction process via the keyboard 114 and the display monitor 115. As soon as the operator decides that the required quality is reached, he can instruct the PROM programmer 116 to store the appropriate signals ($X_1$, $Y_i$, $S_{x1}$, $S_{y1}$), derived from the corrected $\alpha_1$ and $|I_1|$, in the PROM 117, containing the target XY-vector data ($X_i$, $Y_i$, $S_{xi}$, $S_{yi}$). These signals will drive the stepping motor driver in the final system. The ($Fosc,\gamma$)-diagram 122 gives in the first quadrant the slope $\gamma$ as a function 123 of the oscillation frequency. This function depends only on the magnetic stiffness and the inertia of the system.

The second quadrant shows the magnetic stiffness as a function 124 of the length $|I_1|$ of the current-vector $I_1$ at a specific micro step 1. Each curve 124, 124' and 124" corresponds to a specific micro step 1, wherein 1 can take any value from 1 to last (=e.g. 64 or 6400). The target frequency $Fosc_T$ gives the target $\gamma$. The target $\gamma$ gives on the correct curve 124 for vector 1 the current length |II| of the current-vector I.

In FIG. 13 we describe the ideal situation where the stepping motor is driven by corrected micro stepping such that the magnetic spring stiffness is equal over all micro steps and that the angular points of equilibrium at zero RLT are equally distributed over a circle. This corresponds in the magnetic field vector diagram with vectors of equal length— giving the magnetic spring stiffness—and equal angular difference between two consecutive micro steps—giving the angular position at zero RLT.

To reach a constant velocity, the micro steps are issued at constant time intervals $\Delta t$. The (time,micro step) diagram 125 in FIG. 13a can now be travelled in both directions from left to right or vice versa with micro step numbers [0,last-1], dependent on the required sense of rotation. In the preferred embodiment, last can be 64 for a 4FS correction or can be 6400 for a full rotor turn correction. A vector pointer control unit, generating said micro step numbers, addresses in the PROM 126 with VAVLM correction the control signals for the consecutive micro steps. As shown in the VAVLM current-vector diagram 127 in FIG. 13b, the control signals designate consecutive ($I_x$, $I_y$) current-values, the vector length |I| of which is not constant, but |I| is modulated. Also the difference between two consecutive current-vector angles Δα is not constant but modulated. Said current-values ($I_x$, $I_y$) are fed simultaneously in the stepping motor, causing a magnetic field as shown in the corrected magnetic field vector diagram 129 in FIG. 13c. The endpoints of the magnetic field vector are situated on the perimeter of a circle, i.e. |h| is constant; and the angle increments per micro step are all equal, i.e. Δβ is constant. To the thus energised stepping motor, an external rotor load torque (RLT)— strongly dependent from the rotor angular speed—is applied by the load of the system 130. The influence of the RLT on the behaviour of the stepping motor is sketched in the (RARS,Torque) diagram 131 13d. All MFT lines are parallel because the magnetic spring stiffness is equal and the distance between these parallel lines is equal, because the points of zero load RLT are evenly distributed over the circle. This means that for a positive torque $RLT_j$ or a negative torque $RLT_k$, whatever the magnitude of the torque may be, the angular points of equilibrium are equidistant, because the same distances Δδ are cut on the slanted MFT lines. This means that the rotor will rotate over constant angular distances Δδ for consecutive micro steps. The (rotor angle, time) diagram 132 in FIG. 13e then shows in abscissa the constant time intervals Δt for application of the consecutive micro steps and in ordinate the resulting constant angular displacements Δδ. From this diagram can be understood that the rotor speed, being Δδ/Δt or the slope of said diagram, is constant, whatever the external rotor load torque may be.

The Horizon Plus (Trade Mark of Agfa-Gevaert N.V.) is a scanner system manufactured and distributed by Agfa-Gevaert N.V. in Mortsel, Belgium. By applying the method of this invention, the amplitude of the vibrations was decreased by a factor of five up to ten. The Horizon Plus transport system consists mainly of a carriage, a transport cable in a stretched wire connection, a sliding bar, the stepping motor and a return wheel. The scanning subsystem slides through the main housing of the Horizon Plus on two skates, which are guided by the sliding bar and are driven by a stepping motor with 400 steps and a cable system. Only this sliding introduces friction in the system.

Positioning is controlled by the motor steps. The motor is mounted in such a manner that one full turn thereof is equivalent to a 35 mm displacement of the scanning unit, meaning that each micro step of the motor results in a 5 μm displacement of the scanning motor. The scanning unit is operated in such a manner that there are four micro steps, i.e. 20 μm displacement, per scanning line. One full step or sixteen micro steps correspond with four scan lines. The positioning accuracy must be about ten micro meter, or half a pixel at 1200 dpi. Normal scanning is done at a speed of about 1 mm/s, giving a full step frequency of 11 Hz.

FIG. 14 shows the current-vector diagram of a stepping motor for the Horizon Plus. The solid circle 133 gives the theoretical envelope for the endpoints of the current-vectors. The dotted points 134 in the neighbourhood of the circle are the endpoints of the basic micro stepping vectors for sixteen micro steps per full step. Due to quantisation, the dotted points 134 don't coincide exactly with the intersection of the circle 133 and the rays drawn at the theoretical angles i*5.625°.

The centres of the small circular points 135 give the endpoints of the current-vector for vector angle modulated (VAM) micro stepping, described by the method of the current invention. As can be seen, the VAM corrected endpoints 135 still lie close to the circular envelope, but they make angles α' different from the angles related to basic micro stepping. Although Δα' seems not too different from Δα for basic micro stepping, these differences add up and give a considerable other angle α' for the same micro step.

FIG. 15 shows the $I_{xi}$ and $I_{yi}$ values as a function of time. At constant time intervals of 6.25 ms a new value $I_{xi}$ and $I_{yi}$ are generated simultaneously. The theoretical continuous curve as in formula (I) for $I_x$ and $I_y$ is given by the solid lines 136 and 137 respectively. The dotted points 139 give the quantized values according to formula (II) for basic micro stepping and are very close or substantially equal to the values of curves 136, 137. The centre of the circular points 140 give the current-value for VAM-corrected micro stepping. As can be noticed, at some moments in time, the value is substantially different from the value required for basic micro stepping.

Although the present invention has been described with reference to preferred embodiments, those skilled in the art will recognise that changes may be made in form and detail without departing from the spirit and scope of the invention.

I claim:

1. A method for driving a two phase stepping motor at a desired constant angular speed in micro stepping mode comprising the following steps:

choosing a maximum constant current-value $I_0$, based upon the characteristics of said stepping motor;

establishing a sequence of M current-value pairs ($I_{xi}$, $I_{yi}$), current-value $I_{xi}$ corresponding to the electric intensity $I_x$ of a current in a coil X of said stepping motor and current-value $I_{yi}$ corresponding to the electric intensity $I_y$ of a current in a coil Y of said stepping motor;

establishing the duration T of a micro step based upon said desired angular speed;

applying repeatedly said sequence wherein each of said current-value pairs ($I_{xi}$, $I_{yi}$) is applied sequentially and wherein $I_x$ and $I_y$ corresponding to said current-value pair ($I_{xi}$,$I_{yi}$) are applied simultaneously to said coil X and Y for said duration T of a micro step;

wherein said current-value pairs ($I_{xi}$, $I_{yi}$) have following properties:

(1) the square root I of the quadratic sum $I^2=I^2_{xi}+I^2_{yi}$ of the current-values $I_{xi}$ and $I_{yi}$ of each individual current-value pair has a value substantially equal to said maximum constant current-value $I_0$;

(2) a plurality of current-values $I_{xi}$ have a value substantially equal to $I*\cos(360°*i/N+\alpha)$, wherein:

I is said square root of said quadratic sum $I^2$;

i is an integer index in the sequence ($I_{xi}$,$I_{yi}$), ranging from 1 to M;

N is an integer divider of M; and

α is an arbitrary constant;

is characterised therein that:

(3) at least one current-value $I_{xi}$ has a value substantially different from $I*\cos(360° *i/N+\alpha)$.

2. The method of claim 1 comprising the step of storing the current-value pairs ($I_{xi}$, $I_{yi}$) in a memory means.

3. The method of claim 2 1 comprising the step of storing the current-value pairs ($I_{xi}$,$I_{yi}$) in a non-volatile memory means.

4. The method of claim 1 comprising the step of storing the current-value pairs ($I_{xi}$, $I_{yi}$) in a programmable read only memory means.

5. The method of claim 1 comprising the step of determining the current-value pairs ($I_{xi}$, $I_{yi}$) by means for detecting the rotation of the rotor of the stepping motor.

6. The method of claim 1 comprising the step of determining the current-value pairs ($I_{xi}$, $I_{yi}$) by rotation encoder.

7. The method of claim 5 wherein said system performs the following steps:
   (1) driving the stepping motor according to a known sequence of current-value pairs ($I_{xi}$, $I_{yi}$), said known sequence having at least the properties (1) and (2) defined in claim 1 for ($I_{xi}$, $I_{yi}$);
   (2) utilizing the output of the rotation detecting means to produce an indication of the performance characteristics of the stepping motor;
   (3) modifying the sequence of current-value pairs ($I'_{xi}$, $I'_{yi}$) to a sequence ($I_{xi}$, $I_{yi}$) according to said performance characteristics; and
   (4) incorporating the modified sequence in a non-volatile memory means.

8. The method of claim 7 comprising the step of utilizing the output of the rotation detecting means to produce an indication of the angular speed of said rotor of said stepping motor.

9. The method of claim 7, comprising the step of designating said non-volatile memory means and said stepping motor as one kit.

10. The method of claim 7, comprising the steps of iterating steps (1) to (3) a plurality of times and equating said known sequence of step (1) to said modified sequence of the previous step (3).

11. The method of claim 10, comprising the step of stopping the step of iterating after a fixed number of times.

12. The method of claim 10, comprising the step of stopping the step of iterating by considering the angular speed of said rotor of said stepping motor.

13. The method of claim 12, wherein application of the criterion comprises following steps:
   establishing the frequency spectrum of the angular speed of said rotor;
   computing a weighted sum of the amplitudes of said frequency spectrum;
   comparing said weighted sum with a weighted sum from a previous iteration; stopping the step of iterating depending on the result of said comparing step.

14. The method of claim 1, comprising the step of choosing at least one said square root I value substantially different from said constant current-value $I_0$.

15. The method of claim 7, comprising the step of choosing at least one said square root I value substantially different from said constant current-value $I_0$.

16. The method of claim 1, comprising the step of driving said stepping motor a stepping motor driver corrected for linearity and balance.

* * * * *